US010884269B2

United States Patent
Fujiwara et al.

(10) Patent No.: US 10,884,269 B2
(45) Date of Patent: Jan. 5, 2021

(54) METHOD FOR MANUFACTURING A LIQUID CRYSTAL DISPLAY PANEL COMPRISING PERFORMING A PHOTO-ALIGNMENT TREATMENT USING A PHOTO-ALIGNMENT TREATMENT DEVICE HAVING A LIGHT IRRADIATION MECHANISM AND A ROTATION ADJUSTMENT MECHANISM

(71) Applicant: SHARP KABUSHIKI KAISHA, Sakai (JP)

(72) Inventors: Seiji Fujiwara, Sakai (JP); Takashi Sonoda, Sakai (JP); Nobufumi Tomimaru, Sakai (JP); Hitoshi Watanabe, Sakai (JP); Yuhichi Yamamoto, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 90 days.

(21) Appl. No.: 16/314,627

(22) PCT Filed: Jun. 28, 2017

(86) PCT No.: PCT/JP2017/023696
§ 371 (c)(1),
(2) Date: Dec. 31, 2018

(87) PCT Pub. No.: WO2018/008485
PCT Pub. Date: Jan. 11, 2018

(65) Prior Publication Data
US 2019/0324302 A1    Oct. 24, 2019

(30) Foreign Application Priority Data

Jul. 5, 2016 (JP) .............................. JP2016-133744

(51) Int. Cl.
*G02F 1/13* (2006.01)
*G02F 1/1337* (2006.01)

(52) U.S. Cl.
CPC ...... *G02F 1/1303* (2013.01); *G02F 1/133753* (2013.01); *G02F 1/133788* (2013.01);
(Continued)

(58) Field of Classification Search
CPC ... G02F 1/133753; G02F 2001/133742; G02F 2001/133757
See application file for complete search history.

(56) References Cited

U.S. PATENT DOCUMENTS

| | | | |
|---|---|---|---|
| 2009/0279044 A1 | 11/2009 | Hakoi et al. | |
| 2009/0284703 A1 | 11/2009 | Shoraku et al. | |

(Continued)

FOREIGN PATENT DOCUMENTS

| | | | |
|---|---|---|---|
| JP | 2006-133498 A | | 5/2006 |
| JP | 2006133498 A | * | 5/2006 |

(Continued)

*Primary Examiner* — Paul C Lee
(74) *Attorney, Agent, or Firm* — ScienBiziP, P.C.

(57) ABSTRACT

A photo-alignment treatment device for a liquid crystal display panel substrate includes at least one light irradiation mechanism including a light source, a polarizer, and a rotation adjustment mechanism and configured to irradiate a liquid crystal display panel substrate with light emitted from the light source through the polarizer. The device also includes a stage configured to support the liquid crystal display panel substrate thereon. The photo-alignment treatment device is configured to irradiate the liquid crystal display panel substrate with light while moving the liquid crystal display panel substrate or while moving the light source with respect to the liquid crystal display panel substrate. A light irradiation direction with respect to the liquid crystal display panel substrate is parallel to a moving direction of the liquid crystal display panel substrate or a (Continued)

moving direction of the light source. The rotation adjustment mechanism is configured to rotate a polarization axis of the polarizer to adjust an exposure direction on a surface of the liquid crystal display panel substrate to substantially 45° with respect to the light irradiation direction.

10 Claims, 19 Drawing Sheets

(52) U.S. Cl.
CPC ............ *G02F 2001/133742* (2013.01); *G02F 2001/133757* (2013.01)

(56) References Cited

U.S. PATENT DOCUMENTS

| | | |
|---|---|---|
| 2011/0181823 A1 | 7/2011 | Hakoi et al. |
| 2011/0285948 A1 | 11/2011 | Hakoi et al. |
| 2012/0002144 A1 | 1/2012 | Shoraku et al. |
| 2012/0287389 A1 | 11/2012 | Hakoi et al. |
| 2013/0114029 A1 | 5/2013 | Shoraku et al. |

FOREIGN PATENT DOCUMENTS

| | | | |
|---|---|---|---|
| JP | 2009-265290 A | | 11/2009 |
| JP | 2009265290 A | * | 11/2009 |
| JP | 2010-134483 A | | 6/2010 |
| JP | 2011-085738 A | | 4/2011 |
| JP | 5184618 B2 | | 4/2013 |
| JP | 2013-182085 A | | 9/2013 |
| JP | 2013182085 A | * | 9/2013 |
| JP | 2016-024297 A | | 2/2016 |
| JP | 2016024297 A | * | 2/2016 |
| WO | 2015/020083 A1 | | 2/2015 |
| WO | WO-2015020083 A1 | * | 2/2015 ......... C08G 73/1078 |

* cited by examiner

Fig. 11

METHOD FOR MANUFACTURING A LIQUID CRYSTAL DISPLAY PANEL COMPRISING PERFORMING A PHOTO-ALIGNMENT TREATMENT USING A PHOTO-ALIGNMENT TREATMENT DEVICE HAVING A LIGHT IRRADIATION MECHANISM AND A ROTATION ADJUSTMENT MECHANISM

TECHNICAL FIELD

The present invention relates to a photo-alignment treatment device for a liquid crystal display panel substrate and a method for manufacturing a liquid crystal display panel using the photo-alignment treatment device for a liquid crystal display panel substrate.

BACKGROUND ART

Liquid crystal display panels utilize a liquid crystal composition to provide display. A typical display method for such devices irradiates a liquid crystal display panel including a liquid crystal composition enclosed between paired substrates with light from the backlight and applies voltage to the liquid crystal composition to change the alignment of liquid crystal molecules, thereby controlling the amount of light passing through the liquid crystal display panel. Such liquid crystal display panels have a thin profile, light weight, and low power consumption, and are therefore utilized in electronic products such as smartphones, tablet PCs, and automotive navigation systems.

Alignment division techniques have been studied which divide one pixel into multiple alignment regions (domains) to align the liquid crystal molecules at different azimuths in different alignment regions such that the viewing angle characteristics are enhanced. The alignment of a pixel can be divided by, for example, a method that divides a half-pixel into four alignment regions of two rows by two columns. Examples of such an alignment mode include 4 domain-reverse twisted nematic (4D-RTN) mode (e.g., Patent Literature 1, Patent Literature 2) and 4 domain-electrically controlled birefringence (4D-ECB) mode (e.g., Patent Literature 2). Scanning exposure is studied in order to perform the above alignment division (for example, see Patent Literature 3).

CITATION LIST

Patent Literature

Patent Literature 1: JP 5184618 B
Patent Literature 2: JP 2011-85738 A
Patent Literature 3: JP 2010-134483 A

SUMMARY OF INVENTION

Technical Problem

FIG. 16 is a schematic plan view of a half pixel illustrating an example of a dark line generation region in a conventional 4D-RTN mode liquid crystal display panel, and illustrates a time of applying voltage. As illustrated in FIG. 16, in a conventional 4D-RTN mode liquid crystal display panel 300, the half pixel is divided into four alignment regions of two rows by two columns in which tilt azimuths of liquid crystal molecules 341 are different from one another. In Patent Literature 1, the division of the alignment of one pixel into four rows by one column is also studied as an example of the 4D-RTN mode liquid crystal display panel.

In Patent Literature 2, increase in the transmittance of a 4D-RTN mode liquid crystal display panel is considered using an electrode configuration including a main part and multiple branches extending parallel to each other from the main part. FIG. 19 is a schematic plan view of a half pixel illustrating another example of the dark line generation region in a conventional 4D-RTN mode liquid crystal display panel 400, and illustrates the time of applying the voltage. As illustrated in FIG. 19, in a conventional 4D-RTN mode liquid crystal display panel 400, the half pixel is divided into four alignment regions of two rows by two columns in which the tilt azimuths of liquid crystal molecules 441 are different from one another.

The following describes an exemplary conventional method for manufacturing a 4D-RTN mode liquid crystal display panel. FIGS. 20 and 21 are views illustrating an example of photo-alignment treatment in the conventional 4D-RTN mode liquid crystal display panel 300, FIG. 20 is a view illustrating the photo-alignment treatment for a TFT substrate, and FIG. 21 is a view illustrating the photo-alignment treatment for a CF substrate. FIGS. 23 and 24 are views illustrating an example of photo-alignment treatment in the conventional 4D-RTN mode liquid crystal display panel 400, FIG. 23 is a view illustrating the photo-alignment treatment for the TFT substrate, and FIG. 24 is a view illustrating the photo-alignment treatment for the CF substrate. Although described in detail later, as illustrated in FIGS. 20 and 21, in the photo-alignment treatment in the liquid crystal display panel 300, a moving direction of a substrate or a light source is parallel to a light irradiation direction. On the other hand, as illustrated in FIGS. 23 and 24, in the photo-alignment treatment in the liquid crystal display panel 400, the moving direction of the substrate or the light source is orthogonal to the light irradiation direction.

Scanning exposure (hereinafter, also referred to as scan exposure) in which exposure is performed while the substrate or the light source is moved can be cited as an example of the photo-alignment treatment method. However, for example, when the tilt azimuth of the liquid crystal molecule is set to substantially 45° in the liquid crystal display panel while the azimuth along a lateral direction of the pixel is defined as 0°, sometimes the tilt azimuth of the liquid crystal molecule does not become 45° in the actually manufactured liquid crystal display panel, even if the polarizer is disposed such that the polarization axis of the polarizer and the light irradiation direction with respect to the liquid crystal display panel substrate forms an angle of 45°.

The present invention has been made in view of such a current state of the art and aims to provide a photo-alignment treatment device for a liquid crystal display panel substrate and a method for manufacturing a liquid crystal display panel, for being able to set the tilt azimuth of the liquid crystal molecules to a target angle.

Solution to Problem

The inventors of the present invention found that, when the liquid crystal display panel substrate is irradiated with the light from the light source, depending on an light irradiation angle with respect to the substrate, the azimuth of the polarization axis of the polarizer with respect to the light irradiation direction is not matched with an exposure direction on the substrate surface, and the tilt azimuths of the liquid crystal molecules deviate from a desired angle. The inventors found that the tilt azimuths of the liquid crystal molecules in the liquid crystal display panel can be controlled by rotating the polarization axis of the polarizer with a rotation adjustment mechanism and adjusting the exposure direction on the substrate surface. The inventors have thereby solved the above problems, arriving at the present invention.

An aspect of the present invention may be a photo-alignment treatment device for a liquid crystal display panel substrate, the photo-alignment treatment device including: at least one light irradiation mechanism including a light source, a polarizer, and a rotation adjustment mechanism and configured to irradiate a liquid crystal display panel substrate with light emitted from the light source through the polarizer; and a stage configured to support the liquid crystal display panel substrate thereon, the photo-alignment treatment device being configured to irradiate the liquid crystal display panel substrate with light while moving the liquid crystal display panel substrate or while moving the light source with respect to the liquid crystal display panel substrate, a light irradiation direction with respect to the liquid crystal display panel substrate being parallel to a moving direction of the liquid crystal display panel substrate or a moving direction of the light source, the rotation adjustment mechanism being configured to rotate a polarization axis of the polarizer to adjust an exposure direction on a surface of the liquid crystal display panel substrate to substantially 45° with respect to the light irradiation direction.

The present invention can provide a method for manufacturing a liquid crystal display panel capable of tilting the liquid crystal molecules in a target azimuth by performing the photo-alignment treatment using the photo-alignment treatment device for a liquid crystal display panel substrate.

Another aspect of the present invention may be a method for manufacturing a liquid crystal display panel including: forming a first vertical alignment film on a surface of a first substrate including a pixel electrode and forming a second vertical alignment film on a surface of a second substrate including a counter electrode; performing a photo-alignment treatment by irradiating the first substrate provided with the first vertical alignment film on the surface and the second substrate provided with the second vertical alignment film on the surface with light emitted from a light source through a polarizer; and forming a liquid crystal layer containing liquid crystal molecules between the first substrate and the second substrate, the photo-alignment treatment being performed using the photo-alignment treatment device for a liquid crystal display panel substrate of the present invention.

Advantageous Effects of Invention

The photo-alignment treatment device for a liquid crystal display panel substrate and the method for manufacturing a liquid crystal display panel of the present invention are capable of tilting the liquid crystal molecules in a target azimuth.

BRIEF DESCRIPTION OF DRAWINGS

FIG. 11 is a view illustrating an example of photo-alignment treatment for a TFT substrate in the liquid crystal display panel of Example 1.

DESCRIPTION OF EMBODIMENTS

Hereinafter, embodiments of the present invention are described. The following embodiments, however, are not intended to limit the scope of the present invention, and appropriate modifications can be made within the spirit of the present invention.

Embodiment 1

Figure 1:
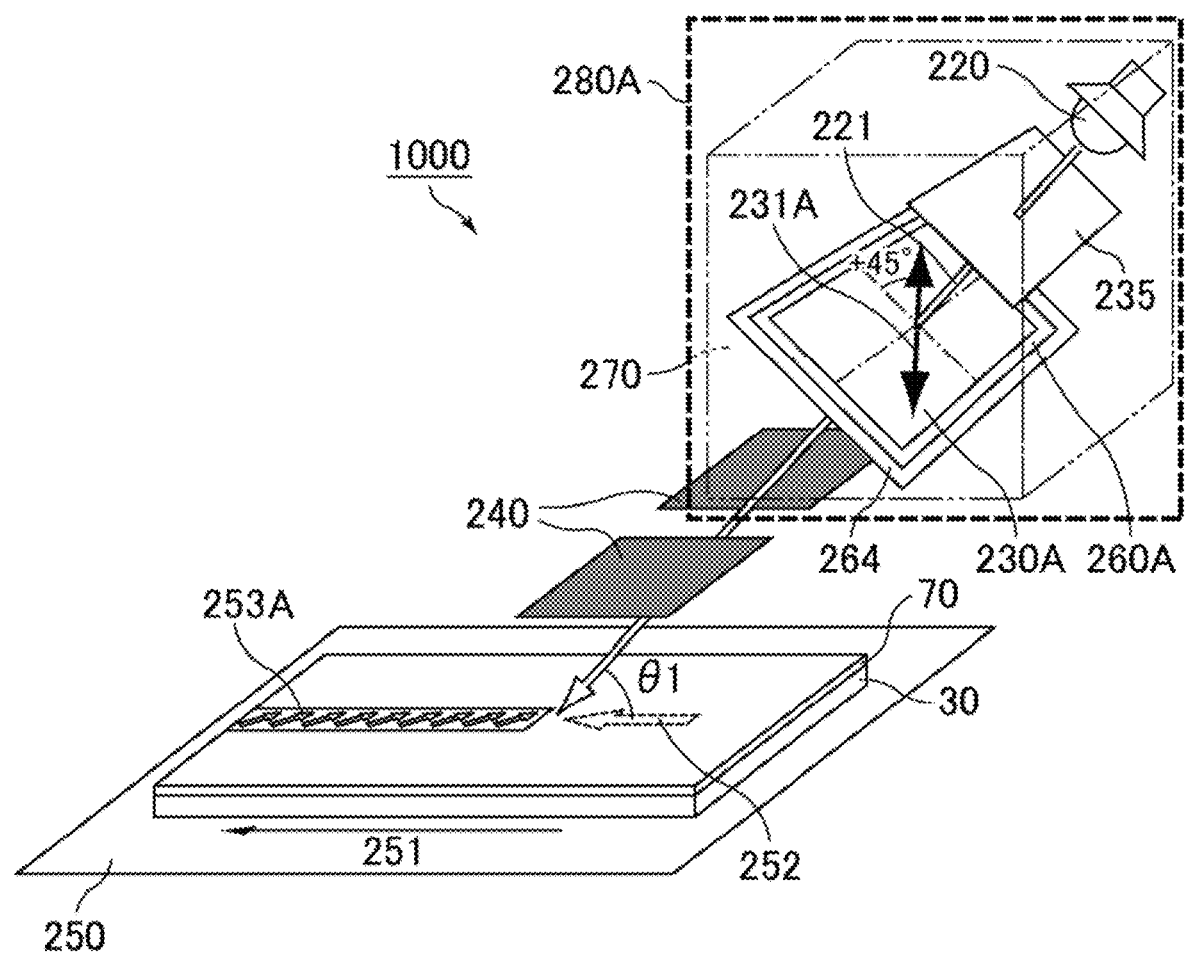
FIG. 1 is a schematic diagram illustrating an example of a photo-alignment treatment device according to Embodiment 1.

A photo-alignment treatment device for a liquid crystal display panel substrate according to Embodiment 1 will be described below with reference to FIG. 1. FIG. 1 is a schematic diagram illustrating an example of the photo-alignment treatment device of Embodiment 1. As illustrated in FIG. 1, a photo-alignment treatment device 1000 of Embodiment 1 is a photo-alignment treatment device for a liquid crystal display panel substrate, and includes a light irradiation mechanism 280A and a stage 250 configured to support a liquid crystal display panel substrate 30 thereon.

The liquid crystal display panel substrate 30 is not particularly limited as long as it is a substrate used for a liquid crystal display panel. The liquid crystal display panel substrate 30 may be an active matrix substrate (TFT substrate) or a color filter substrate (CF substrate). The liquid crystal display panel substrate 30 may include a vertical alignment film 70 on a surface thereof.

The light irradiation mechanism 280A includes a light source 220, a polarizer 230A, and a rotation adjustment mechanism 260A. The light source 220 and the polarizer 230A may be disposed in a lamp box 270. A type of the light source 220 is not particularly limited, but a light source typically used in the field of the photo-alignment treatment device can be used. For example, a low-pressure mercury lamp, a deuterium lamp, a metal halide lamp, an argon resonance lamp, and a xenon lamp can be used.

Light 221 emitted from the light source 220 may be light (electromagnetic wave) such as ultraviolet light and visible light, and the light 221 preferably has a wavelength of 280 nm to 400 nm.

For example, the polarizer 230A extracts linearly polarized light from the light emitted from the light source 220 toward the liquid crystal display panel substrate 30. The term "polarization axis" refers to a direction in which an amount of light passing through the polarizer is maximized. Examples of the polarizer 230A include an organic resin type polarizer, a wire grid polarizer, and a Polarizing Beam Splitter (PBS).

A polarizer obtained by adsorbing iodine in polyvinyl alcohol and stretching polyvinyl alcohol in a sheet shape can be cited as an example of the organic resin polarizer.

For example, the wire grid polarizer includes a light transmissive base material and multiple metal thin wires formed on the light transmitting base material, and the multiple metal thin wires are disposed in a period shorter than the wavelength of light incident on the wire grid polarizer. The metal thin wire is made of a light absorbing metal material such as chromium. When the wire grid polarizer is superimposed on the liquid crystal display panel substrate 30 and irradiated with the light, the liquid crystal molecules are aligned in azimuth orthogonal to a stretching direction of the metal thin wire. When the polarizer 230A is the wire grid polarizer, the polarization axis is the azimuth orthogonal to the stretching direction of the metal thin wire. Alignment division process can efficiently be performed using the wire grid polarizer having different stretching azimuths of metal thin wire.

A cube type polarization beam splitter or plate type polarization beam splitter can be cited as an example of the polarization beam splitter. A PBS, in which slopes of two prisms are bonded to each other and an optical thin film is evaporated on one of the slopes, can be cited as an example of the cube-type PBS.

The polarizer 230A may be disposed perpendicular to a light irradiation axis. When the polarizer 230A is not disposed perpendicularly to the light irradiation axis, sometimes the alignment of the liquid crystal molecules is affected by a waveguide effect in the polarizer. The light irradiation axis is a rectilinear propagation direction of the light 221 emitted from the light source 220 toward the liquid crystal display panel substrate 30. That the polarizer is disposed perpendicular to the light irradiation axis means that the polarizer is disposed such that the light is emitted from a normal direction of the polarizer toward the liquid crystal display panel substrate, and the term "vertical" means a range in which an angle formed between the normal line of the polarizer and the light irradiation axis is less than 0.5°.

A wavelength selection filter 235 may be provided between the light source 220 and the polarizer 230A. The the wavelength selection filter 235 may be configured to transmit light having a dominant wavelength ranging from 280 nm to 400 nm. The selection wavelength of 280 nm to 400 nm can produce a structural change of a material, which constitutes the photo-alignment film and exhibits a photo-alignment characteristic, and develop alignment regulating force. The light emitted from the light source may have an intensity ranging from 10 mJ/cm$^2$ to 100 mJ/cm$^2$.

The wavelength selection filter 235 is not particularly limited, and a wavelength selection filter typically used in the field of the photo-alignment treatment device can be used. A wavelength selection filter in which a substance absorbing a wavelength other than the transmissive wavelength is dispersed in the filter or a wavelength selection filter in which a substance reflecting a wavelength other than the transmissive wavelength is coated on the surface of the filter can be cited as an example of the wavelength selection filter 235.

The light applied to the liquid crystal display panel substrate 30 may have an irradiation angle ranging from 30° to 60°. The irradiation angle is expressed by θ1 in FIG. 1, and is an angle formed between a plane of the liquid crystal display panel substrate 30 and the light irradiation axis when the surface of the liquid crystal display panel substrate 30 is set to 0° and when the normal line of the liquid crystal display panel substrate 30 is set to 90°.

The polarizer may have an extinction ratio ranging from 50:1 to 500:1. The extinction ratio is represented by Tmax:Tmin, where Tmax is the maximum transmittance when the polarizer is irradiated with light and Tmin is the minimum transmittance obtained by rotating the polarizer by 90°. The light in the desired polarization axis direction is taken out with increasing extinction ratio (a value of Tmax in the case that Tmin is set to 1), so that a variation in tilt azimuth of the liquid crystal molecule can be reduced.

The rotation adjustment mechanism 260A is configured to rotate the polarization axis 231A of the polarizer 230A to adjust an exposure direction 253A on the surface of the liquid crystal display panel substrate 30 to substantially 45° with respect to a light irradiation direction 252. By setting the exposure direction 253A to substantially 45° with respect to the light irradiation direction 252, the photo-alignment treatment can be performed on the liquid crystal display panel substrate 30 by scanning exposure having excellent productivity while a moving direction 251 of the liquid crystal display panel substrate 30 is kept in parallel with the irradiation direction 252 of the light source. As illustrated in FIG. 1, the light irradiation direction 252 means a light traveling direction when the light 221 emitted from the light source 220 is projected onto the surface of the liquid crystal display panel substrate 30. The exposure direction 253A means the vibration direction of polarized light emitted from the light source 220 to the surface of the liquid crystal display panel substrate 30 through the polarizer 230A. A pre-tilt azimuth that the vertical alignment film 70 formed on the surface of the liquid crystal display panel substrate 30 provides to the liquid crystal molecules is fixed by the exposure direction 253A.

For example, the adjustment of the polarization axis 231A by the rotation adjustment mechanism 260A is performed by the following method. First, the polarizer 230A is set such that the polarization axis 231A becomes 45° with respect to the irradiation direction 252 of the light source. The azimuth of the polarization axis before the polarization axis is adjusted by the rotation adjustment mechanism is also referred to as "45° azimuth". Subsequently, the rotation adjustment mechanism 260A rotates the polarizer 230A from the 45° azimuth to adjust the azimuth of the polarization axis 231A based on data calculated by geometric computation in consideration of the light irradiation angle with respect to the liquid crystal display panel substrate and a refractive index of the alignment film material. The rotation adjustment mechanism 260A can match the azimuth of the polarization axis of the polarizer with respect to the light irradiation direction with the exposure direction on the surface of the liquid crystal display panel substrate 30 to set the tilt azimuth of the liquid crystal molecules in the liquid crystal display panel to a desired angle. When the photo-alignment treatment is performed with no use of the rotation adjustment mechanism 230A while the polarization axis 231A is fixed to the 45° azimuth, sometimes the tilt azimuth of the liquid crystal molecule deviates by about 10° from about 45°.

The rotation adjustment mechanism 260A may be configured to rotate the polarization axis of the polarizer 230A in the range of −15° to +15° from the 45° azimuth. When the rotation adjustment mechanism 260A rotates the polarization axis in the range of −15° to +15°, even if the light irradiation angle is changed with respect to the liquid crystal display panel substrate 30, the exposure direction 253A can be adjusted to set the tilt azimuth of the liquid crystal molecule to a desired angle. For example, the polarization axis 231A is rotated from the 45° azimuth by +7.55° and set to 52.55° in order to adjust the exposure direction 253A on the surface of the liquid crystal display panel substrate to substantially 45° with respect to the light irradiation direction 252.

Figure 8:
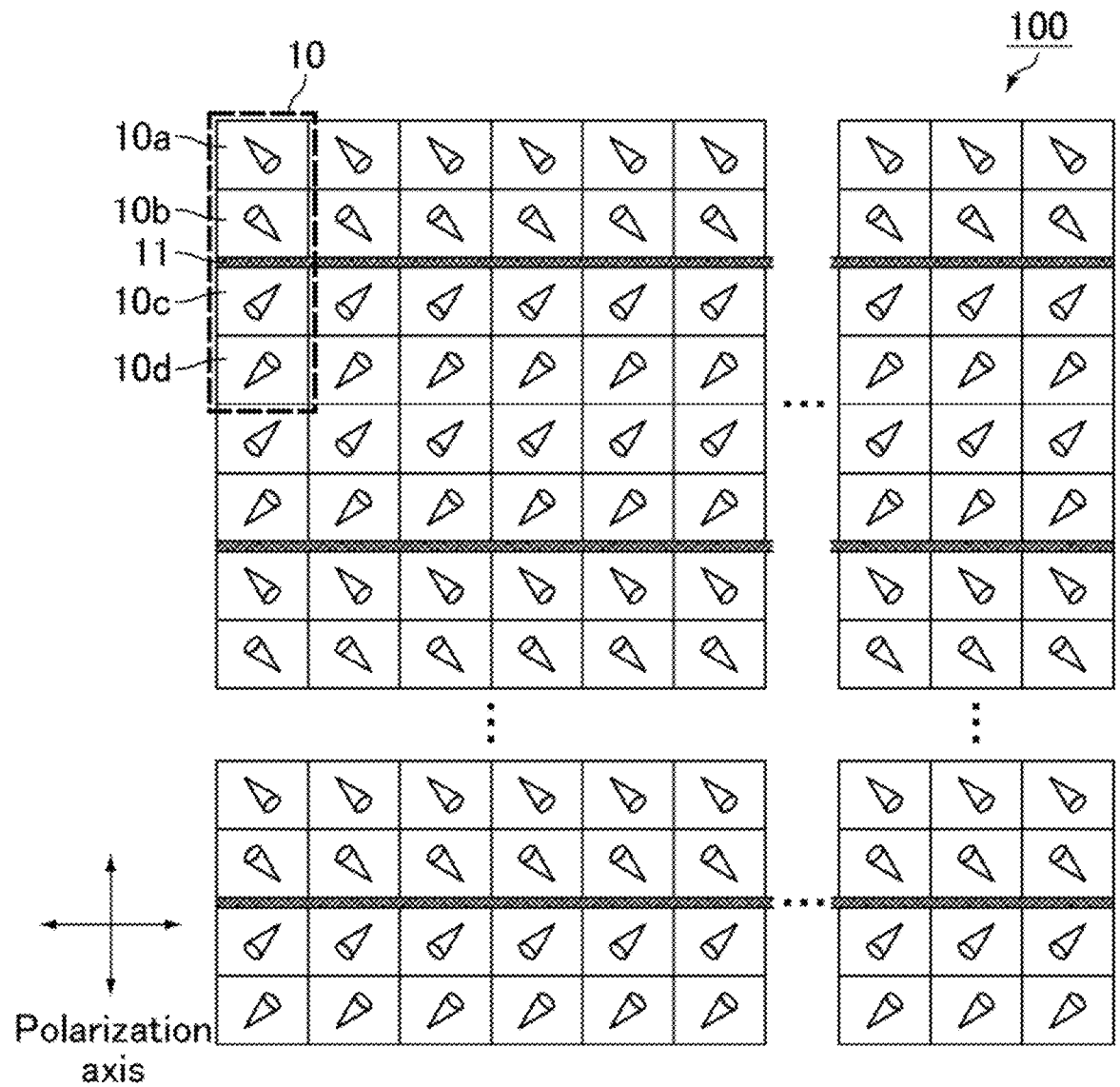
FIG. 8 is a schematic plan view of the liquid crystal display panel in FIG. 7.

Embodiment 1 further includes a rotation mechanism 264. The rotation mechanism 264 can be configured to rotate the polarization axis 231A of the polarizer 230A by an angle selected from substantially 45° and substantially 90° from the 45° azimuth. Assuming that an azimuth of 45° clockwise with respect to the irradiation direction 252 of the light source is +45° azimuth, when the polarization axis 231A of the polarizer 230A is rotated by 90° from the +45° azimuth, the rotated polarization axis 231A becomes −45° azimuth with respect to the light irradiation direction 252. The polarization axis 231A is rotated by 90° from the +45° azimuth and adjusted by the rotation adjustment mechanism 260A, which allows the light irradiation to be performed while the exposure direction 253A is set to substantially 45° with respect to the light irradiation direction 252 before and after the rotation. Consequently, Embodiment 1 is suitable for manufacturing a liquid crystal display panel having a new alignment control mode, in which four alignment regions having mutually different tilt azimuths of the liquid crystal molecules are arranged along a longitudinal direction of the pixel as illustrated in FIG. 8. The liquid crystal display panel having the new alignment control mode can be manufactured by the scanning exposure, so that the production efficiency can greatly be improved. The term "substantially 45° or substantially 90° from the 45° azimuth" means a range of an angle of 15° clockwise or counterclockwise from 45° or 90° with respect to the 45° azimuth, respectively. The 45° azimuth and the 90° azimuth refer to a range of ±0.5° from 45° and 90°, respectively.

The rotation mechanism 264 can also be configured to rotate the polarization axis 231A of the polarizer 230A from the 45° azimuth to substantially 45°. When the polarization axis 231A is rotated by 45° from the 45° azimuth, the rotated polarization axis 231A is parallel to the light irradiation direction, so that the conventional photo-alignment treatment in which the polarization axis of the polarizer is matched with the light irradiation direction can also be performed. According to the photo-alignment treatment device 1000 of Embodiment 1, not only the liquid crystal display panel having the new alignment control mode in FIG. 8 but also the conventional 4D-RTN mode liquid crystal display panels 300 and 400 in FIGS. 20 to 25 can also be manufactured by one apparatus.

The stage 250 is a stage configured to support the liquid crystal display panel substrate 30 thereon. The liquid crystal display panel substrate 30 is fixed on the stage 250, and the liquid crystal display panel substrate 30 is irradiated with the light while the liquid crystal display panel substrate 30 is moved, or the liquid crystal display panel substrate 30 is irradiated with the light while the light source is moved with respect to the liquid crystal display panel substrate 30. The photo-alignment treatment can efficiently be performed by performing the scanning exposure (scan exposure). The light irradiation direction with respect to the liquid crystal display panel substrate 30 is parallel to the moving direction of the liquid crystal display panel substrate 30 or the moving direction of the light source 220, and an incident angle of light incident on the substrate from the light source becomes substantially identical in a light irradiation area of the light source, so that a pre-tilt angle (polar angle) provided to the liquid crystal molecule also becomes substantially identical. For this reason, a variation in pre-tilt angle can be prevented in the light irradiation area to manufacture the liquid crystal display panel having excellent display quality. The photo-alignment treatment device 1000 may include a stage scanning mechanism that moves the stage 250 and/or a light source scanning mechanism that moves the light source 220. The term "parallel" includes a range in which the angle formed between the light irradiation direction and the moving direction of the liquid crystal display panel substrate 30 or the moving direction of the light source 220 is less than 5°.

The photo-alignment treatment device 1000 may include a light-shielding component 240 in addition to the above mechanism(s). The alignment division processing can be performed by performing the photo-alignment treatment while a portion that is not irradiated with the light is shielded by the light-shielding component 240.

The photo-alignment treatment device for a liquid crystal display panel substrate can be used to manufacture the liquid crystal display panel. That is, another aspect of the present invention is a method for manufacturing a liquid crystal display panel including: forming a first vertical alignment film on a surface of a first substrate including a pixel electrode and forming a second vertical alignment film on a surface of a second substrate including a counter electrode; performing a photo-alignment treatment by irradiating the first substrate provided with the first vertical alignment film on the surface and the second substrate provided with the second vertical alignment film on the surface with light emitted from a light source through a polarizer; and forming a liquid crystal layer containing liquid crystal molecules between the first substrate and the second substrate, the photo-alignment treatment being performed using the photo-alignment treatment device for a liquid crystal display panel substrate.

In the method for manufacturing a liquid crystal display panel, because the photo-alignment treatment device for a liquid crystal display panel substrate is used, the azimuth of the polarization axis of the polarizer with respect to the light irradiation direction is matched with the exposure direction on the surface of the liquid crystal display panel substrate, and the tilt azimuth of the liquid crystal molecule in the liquid crystal display panel can be set to the desired angle.

The formation of the first vertical alignment film on the surface of the first substrate including the pixel electrode and the formation of the second vertical alignment film on the surface of the second substrate including the counter electrode are not particularly limited. A method in which a polymer material containing a material exhibiting a photo-alignment characteristic is coated on the surfaces of the first substrate and the second substrate and dried can be cited as an example of the method.

Figure 2:
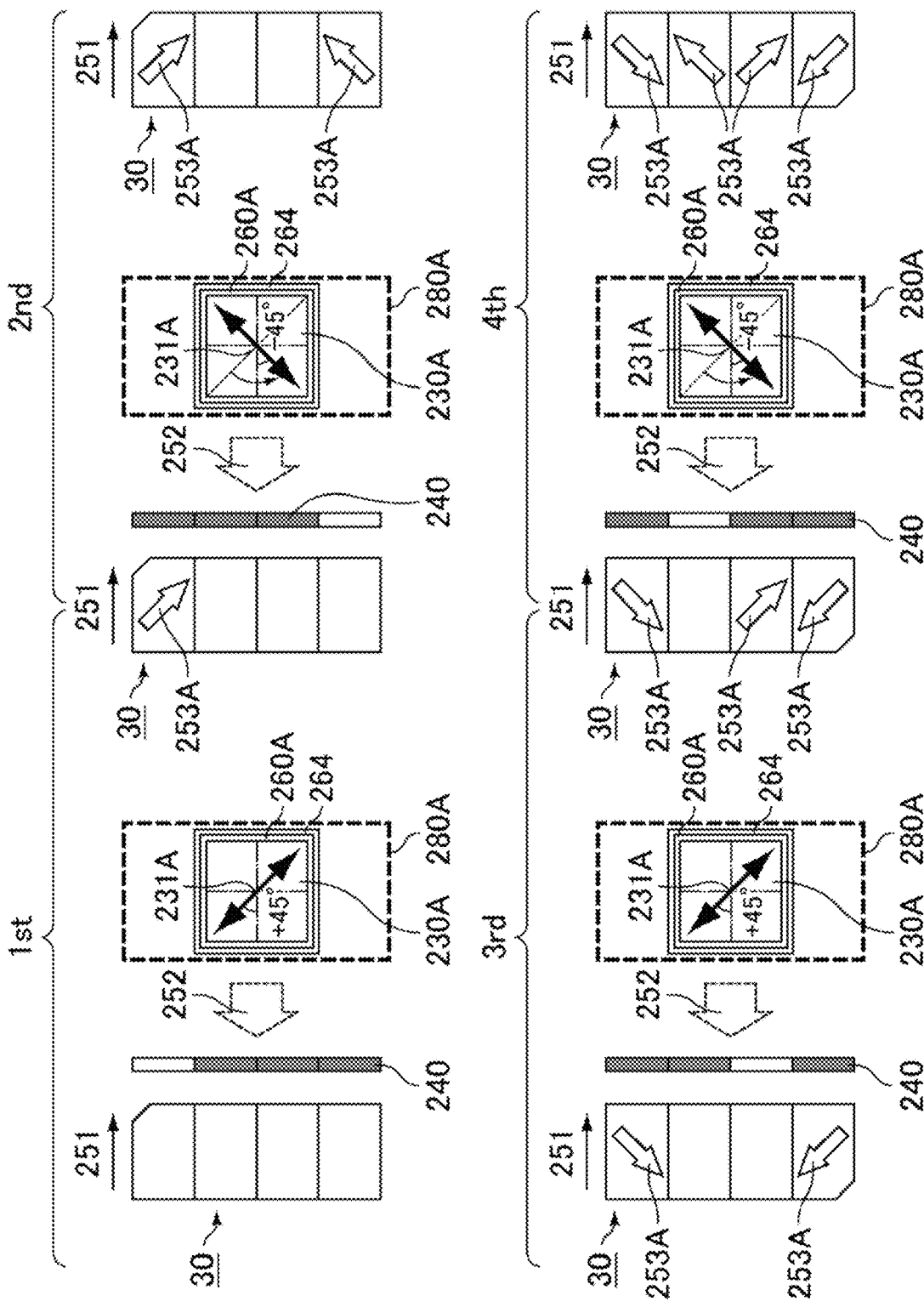
FIG. 2 is a view illustrating an example of photo-alignment treatment using the photo-alignment treatment device of Embodiment 1.

An example of the photo-alignment treatment using the photo-alignment treatment device 1000 of Embodiment 1 will be described below with reference to FIG. 2. FIG. 2 is a view illustrating an example of the photo-alignment treatment using the photo-alignment treatment device of Embodiment 1. The photo-alignment treatment in FIG. 2 is an example in which, using the light irradiation mechanism 280A including one polarizer 230A, the polarization axis 231A of the polarizer 230A is rotated by the rotation mechanism 264 to perform the photo-alignment treatment. In FIG. 2, in order to describe the azimuth of the liquid crystal display panel substrate 30, a notch is illustrated in one corner. However, the actual liquid crystal display panel substrate 30 may not have the notch.

As illustrated in FIG. 2, the moving direction 251 of the liquid crystal display panel substrate 30 is set to the first direction, the light irradiation direction 252 is set to the second direction, and the first-time light irradiation is performed through the wavelength selection filter 235 (not illustrated) and the polarizer 230A using the light irradiation mechanism 280A. The first direction and the second direction were parallel to each other. Portions that should not be irradiated with light are shielded from light with the light-shielding component 240. The polarization axis 231A of the polarizer 230A is set to the +45° direction clockwise with respect to the light irradiation direction 252, and then the rotation adjustment mechanism 260A adjusts the light exposure direction 253A on the surface of the liquid crystal display panel substrate 30 to substantially 45° with respect to the light irradiation direction 252. Then, the first-time light irradiation is performed. Subsequently, the light-shielding component 240 is moved, the polarization axis 231A of the polarizer 230A is rotated by 90° from the +45° azimuth by the rotation mechanism 264, and set to the −45° azimuth counterclockwise with respect to the light irradiation direction 252, and the polarization axis 231A is adjusted by the rotation adjustment mechanism 260A. Then, the second-time light irradiation is performed. Then, the substrate is rotated by 180°, the light-shielding component 240 is further moved, the polarizer 230A is rotated by 90° from the −45° azimuth by the rotation mechanism 264 and set to the +45° azimuth, and the polarization axis 231A is adjusted by the rotation adjustment mechanism 260A. Then, the third-time light irradiation is performed. Finally, the light-shielding component 240 is moved, the polarizer 230A is rotated by 90° from the +45° azimuth by the rotation mechanism 264 and set to the −45° azimuth, the polarization axis 231A is adjusted by the rotation adjustment mechanism 260A. Then, the fourth-time light irradiation is performed. In the liquid crystal display panel substrate 30 subjected to the light irradiation, a pre-tilt azimuth 253A varies in each of regions corresponding to the four alignment regions formed in one pixel. The moving direction 251 of the TFT substrate and the light irradiation direction 252 are identical in all the first-time to fourth-time light irradiations. In all of the first-time to fourth-time light irradiations, the polarization axis 231A is adjusted by the rotation adjustment mechanism 260A such that the exposure direction 253A on the surface of the liquid crystal display panel substrate 30 becomes substantially 45° with respect to the light irradiation direction 252.

The formation of the liquid crystal layer is not particularly limited as long as the liquid crystal layer containing the liquid crystal molecules can be formed between the first substrate and the second substrate. For example, a gap between a pair of substrates subjected to the photo-alignment treatment is filled with the liquid crystal composition to form a liquid crystal layer by a vacuum injection method or a dropping injection method. In the case of adopting the vacuum injection method, application of a sealing agent, bonding of the substrate, curing of the sealing agent, injection of the liquid crystal composition, and sealing of an injection port are performed in this order to enclose the liquid crystal composition, and the liquid crystal layer can be formed. In the case of adopting the dropping injection method, the application of the sealing agent, dropping of the liquid crystal composition, lamination of the substrate, and the curing of the sealing agent are performed in this order to enclose the liquid crystal composition, and the liquid crystal layer can be formed.

Embodiment 2

Figure 3:
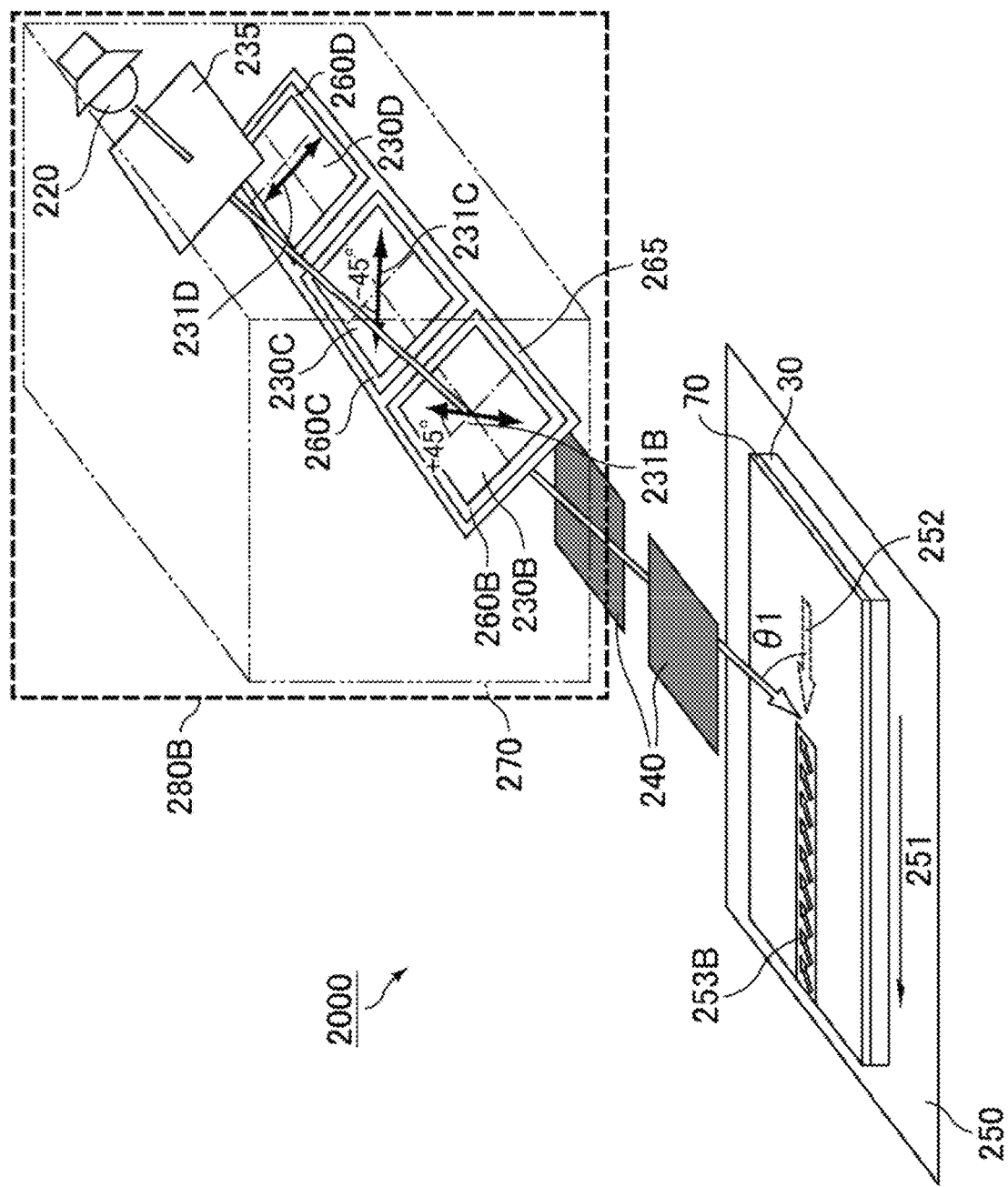
FIG. 3 is a schematic diagram illustrating an example of a photo-alignment treatment device according to Embodiment 2.

A photo-alignment treatment device for a liquid crystal display panel substrate according to Embodiment 2 differs from the photo-alignment treatment device for a liquid crystal display panel substrate according to Embodiment 1 in that the photo-alignment treatment device for a liquid crystal display panel substrate according to Embodiment 2 includes multiple polarizers and a polarizer switching mechanism. FIG. 3 is a schematic diagram illustrating an example of the photo-alignment treatment device of Embodiment 2.

As illustrated in FIG. 3, a photo-alignment treatment device 2000 includes multiple polarizers having polarization axes which are different from each other by substantially 45° or substantially 90°, and further includes the polarizer switching mechanism that is configured to switch the multiple polarizers. As illustrated in FIG. 3, for example, the photo-alignment treatment device 2000 may include a polarizer 230B in which a polarization axis 231B is oriented at 45° with respect to the light irradiation direction 252 and a polarizer 230C in which a polarization axis 231C is substantially different from the polarizer 230B by 90°. Assuming that the 45° azimuth is the +45° azimuth clockwise with respect to the light irradiation direction, the polarization axis 231C of the polarizer 230C is the −45° azimuth counterclockwise with respect to the light irradiation direction. The polarizers 230B and 230C can be switched by a polarizer switching mechanism 265. The polarizer switching mechanism 265 switches between the polarizer 231B having the polarization axis 231B of the +45° azimuth with respect to the light irradiation direction and the polarizer 231C having the polarization axis 231C of the −45 azimuth with respect to the light irradiation direction, and the polarizers 230B and 230C are further adjusted by rotation adjustment mechanisms 260B and 260C, whereby the light irradiation can be performed before and after the switching while an exposure direction 253B is substantially kept at 45° with respect to the light irradiation direction 252. Consequently, Embodiment 2 is suitable for manufacturing a liquid crystal display panel having a new alignment control mode in which four alignment regions having mutually different tilt azimuths of the liquid crystal molecules are arranged along a longitudinal direction of the pixel as illustrated in FIG. 8. The liquid crystal display panel having the new alignment control mode can be manufactured by the scanning exposure, so that the production efficiency can greatly be improved.

The photo-alignment treatment device 2000 may include a polarizer 230D in which a polarization axis 231D is substantially different from that of the polarizer 230B or the polarizer 230C by 45°. The polarization axis 231D of the polarizer 230D is parallel to the light irradiation direction 252. The polarizer switching mechanism 265 switches the polarizer 230C in which the polarization axis 231C of the −45° azimuth with respect to the light irradiation direction to the polarizer 231D in which the polarization axis 231D is parallel to the light irradiation direction, which allows the performance of the conventional photo-alignment treatment in which the polarization axis of the polarizer is matched with the light irradiation direction. Consequently, not only the liquid crystal display panel having the new alignment control mode in FIG. 8 but also the conventional 4D-RTN mode liquid crystal display panels 300 and 400 in FIGS. 20 to 25 can be manufactured by one apparatus.

The same polarizer as the polarizer 230A can be used as the polarizers 230B, 230C, and 230D. The polarizers 230B, 230C, and 230D include rotation adjustment mechanisms 260B, 260C, and 260D, respectively.

The polarizer switching mechanism 265 is not particularly limited as long as it can switch between multiple polarizers. For example, a polarizer switching mechanism in which multiple polarizers are disposed adjacent to each other and switched and a polarizer switching mechanism in which multiple polarizers are arranged in an overlapping manner and a polarizer to be used is taken out can be cited as the polarizer switching mechanism 265.

Figure 4:
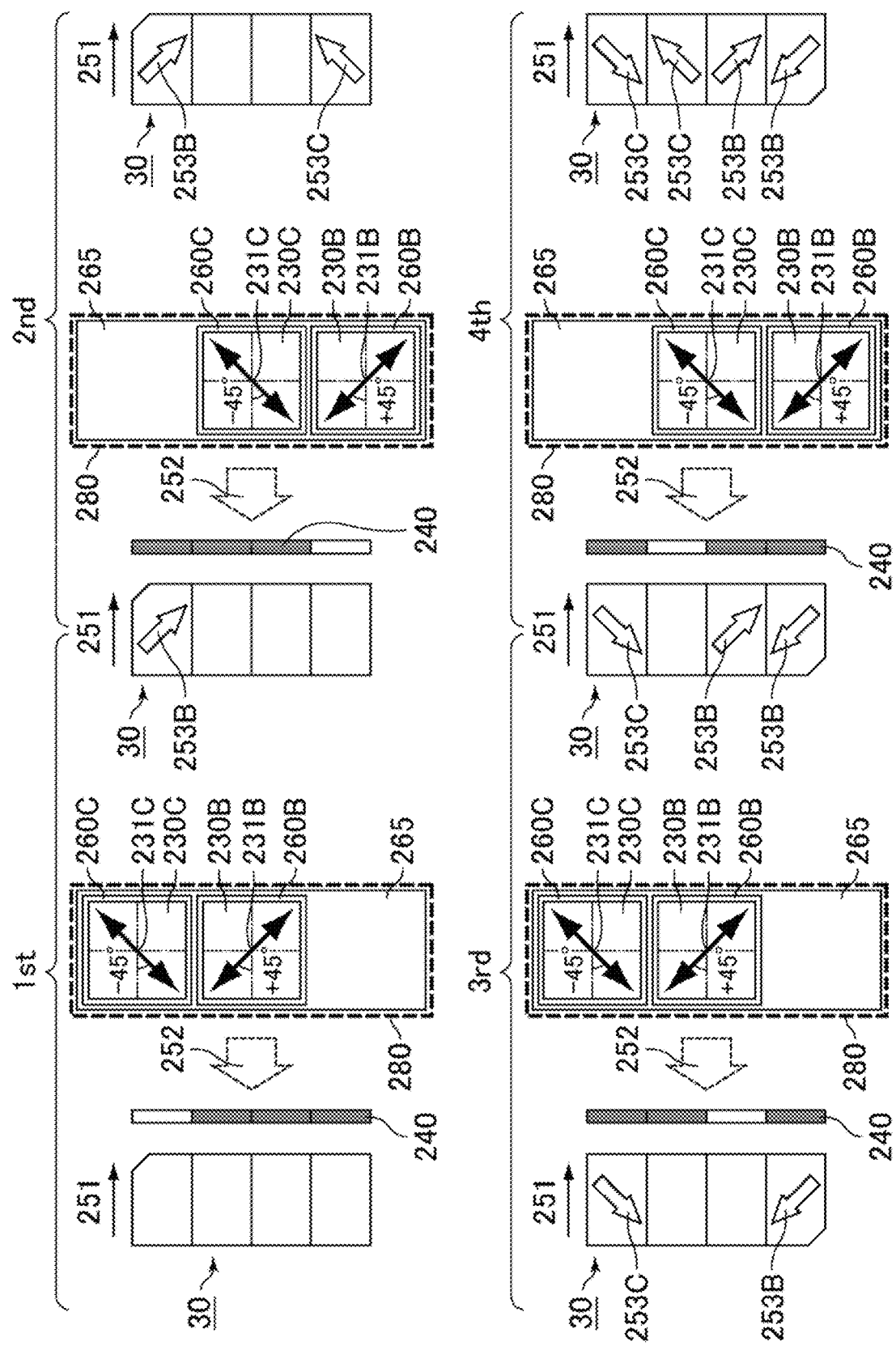
FIG. 4 is a view illustrating an example of photo-alignment treatment using the photo-alignment treatment device of Embodiment 2.

The photo-alignment treatment using the photo-alignment treatment device 2000 according to Embodiment 2 will be described below with reference to FIG. 4. FIG. 4 is a view illustrating an example of the photo-alignment treatment using the photo-alignment treatment device of Embodiment 2. The photo-alignment treatment in FIG. 4 is an example in which the photo-alignment treatment is performed by switching the polarizer 230B and the polarizer 230C by the polarizer switching mechanism 265 using the photo-alignment treatment device 2000 including a light irradiation mechanism 280 including multiple polarizers (the polarizer 230B and the polarizer 230 C). In FIG. 4, in order to describe the azimuth of the liquid crystal display panel substrate 30, a notch is illustrated in one corner. However, the actual liquid crystal display panel substrate 30 may not have the notch.

As illustrated in FIG. 4, the moving direction 251 of the liquid crystal display panel substrate 30 is set to the first direction, the light irradiation direction 252 is set to the second direction, and the first-time light irradiation is performed through the wavelength selection filter 235 (not illustrated) and the polarizer 230A using the light irradiation mechanism 280B. The first direction and the second direction were parallel to each other. Portions that should not be irradiated with light are shielded from light with the light-shielding component 240. The polarization axis 231B of the polarizer 230B is set to the +45° azimuth clockwise with respect to the light irradiation direction 252, and then the rotation adjustment mechanism 260B adjusts the light exposure direction 253B on the surface of the liquid crystal display panel substrate 30 to substantially 45° with respect to the light irradiation direction 252. Subsequently, the light-shielding component 240 is moved, the polarizer switching mechanism 265 switches the polarizer 230B to the polarizer 230C in which the polarization axis 231C is different from the polarization axis 231B by 90°, and the polarization axis 231C is adjusted by the rotation adjustment mechanism 260C. Then, the second-time light irradiation is performed. Then, the substrate is rotated by 180°, the light-shielding component 240 is further moved, the polarizer switching mechanism 265 switches the polarizer 230C to the polarizer 230B, and the polarization axis 231B is adjusted by the rotation adjustment mechanism 260B. Then, the third-time light irradiation is performed. Finally, the light-shielding component 240 is moved, the polarizer switching mechanism 265 switches the polarizer 230B to the polarizer 230C, and the polarization axis 231C is adjusted by the rotation adjustment mechanism 260C. Then, the fourth-time light irradiation is performed. In the liquid crystal display panel substrate 30 subjected to the light irradiation, pre-tilt azimuths 253B and 253C vary in each of regions corresponding to the four alignment regions formed in one pixel. The moving direction 251 of the TFT substrate and the light irradiation direction 252 are identical in all the first-time to fourth-time light irradiations. In all of the first-time to fourth-time light irradiations, the polarization axes 231B and 231C are adjusted by the rotation adjustment mechanisms 260B or 260C such that exposure directions 253B and 253C on the surface of the liquid crystal display panel substrate 30 become substantially 45° with respect to the light irradiation direction 252.

Embodiment 3

Figure 5:
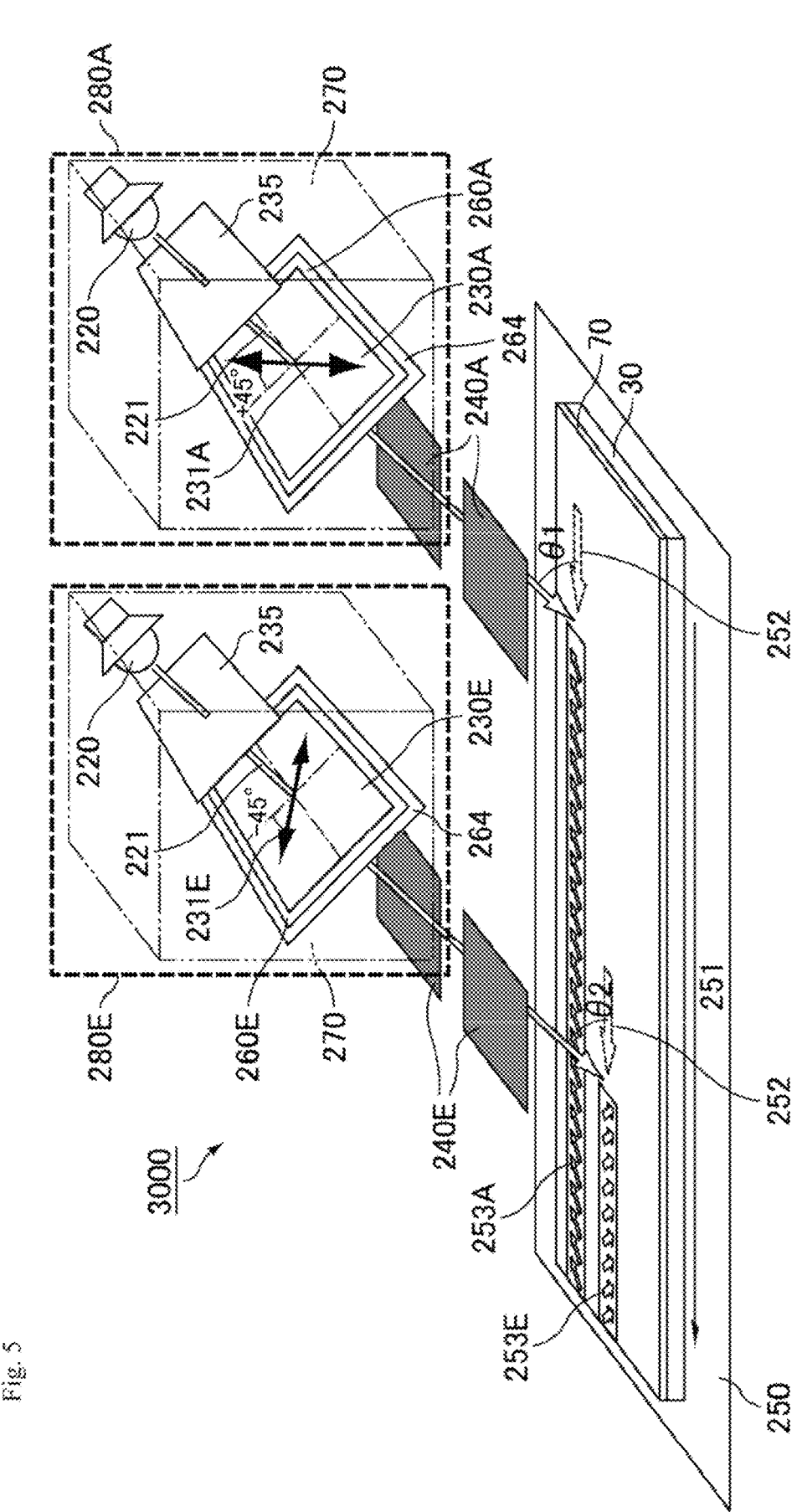
FIG. 5 is a schematic diagram illustrating an example of a photo-alignment treatment device according to Embodiment 3.

The photo-alignment treatment device of the present invention may include at least one light irradiation mechanism, but may have two, three, or four light irradiation mechanisms. A photo-alignment treatment device for a liquid crystal display panel substrate according to Embodiment 3 differs from the photo-alignment treatment device for a liquid crystal display panel substrate of Embodiment 1 in that the photo-alignment treatment device for a liquid crystal display panel substrate of Embodiment 3 includes multiple light irradiation mechanisms. FIG. 5 is a schematic diagram illustrating an example of the photo-alignment treatment device of Embodiment 3.

As illustrated in FIG. 5, a photo-alignment treatment device 3000 for a liquid crystal display panel substrate of Embodiment 3 includes the first light irradiation mechanism 280A and a second light irradiation mechanism 280E. The light irradiation mechanism 280A includes the light source 220, the wavelength selection filter 235, the polarizer 230A, and the rotation adjustment mechanism 260A in the lamp box 270, and the second light irradiation mechanism 280E includes the light source 220, the wavelength selection filter 235, a polarizer 230E, and a rotation adjustment mechanism 260E in the lamp box 270. The photo-alignment treatment device 3000 includes the multiple light irradiation mechanisms, which allows the productivity to be improved.

For example, the first light irradiation mechanism 280A is configured to rotate the polarization axis 231A of the polarizer 230A using the rotation adjustment mechanism 260A, and the polarization axis 231A is adjusted such that the exposure direction on the surface of the liquid crystal display panel substrate 30 becomes substantially 45° with respect to the light irradiation direction. The second light irradiation mechanism 280E includes the polarizer 230E in which a polarization axis 231E is different from the polarization axis 231A of the polarizer 230A included in the first light irradiation mechanism 280A by 900, and the rotation adjustment mechanism 260E rotates the polarization axis 231E of the polarizer 230E, and the polarization axis 231E is adjusted such that the exposure direction on the surface of the liquid crystal display panel substrate 30 becomes substantially 45° with respect to the light irradiation direction. Consequently, the four alignment regions having tilt azimuths of the liquid crystal molecules different from each other can be formed. Each of the first light irradiation mechanism 280A and the second light irradiation mechanism 280E may include the rotation mechanism 264. However, each of the first light irradiation mechanism 280A and the second light irradiation mechanism 280E includes the multiple light irradiation mechanism to be able to perform the photo-alignment treatment without rotating the polarizer using the rotation mechanism 264, without rotating the polarizer by substantially 45° or substantially 90° from the 45° azimuth, or without switching the polarizer using the polarizer switching mechanism.

Figure 6:
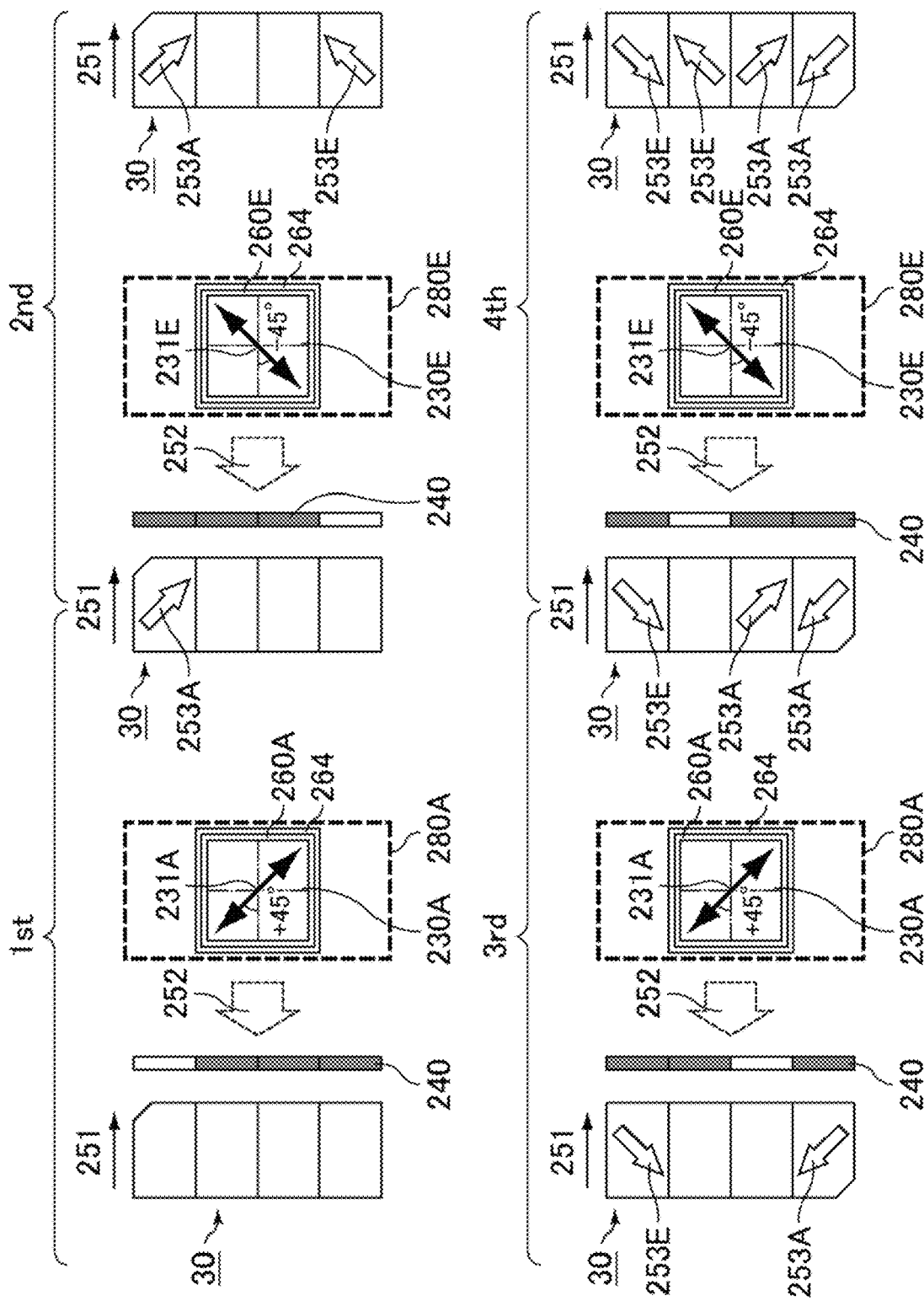
FIG. 6 is a view illustrating an example of photo-alignment treatment using the photo-alignment treatment device of Embodiment 3.

The photo-alignment treatment using the photo-alignment treatment device 3000 according to Embodiment 3 will be described below with reference to FIG. 26. FIG. 6 is a view illustrating an example of the photo-alignment treatment using the photo-alignment treatment device of Embodiment 3. The photo-alignment treatment in FIG. 6 is an example in which the photo-alignment treatment is performed using the multiple light irradiation mechanisms (the light irradiation mechanism 280A and the light irradiation mechanism 280E). In FIG. 6, in order to describe the azimuth of the liquid crystal display panel substrate 30, a notch is illustrated in one corner. However, the actual liquid crystal display panel substrate 30 may not have the notch.

As illustrated in FIG. 6, the moving direction 251 of the liquid crystal display panel substrate 30 is set to the first direction, the light irradiation direction 252 is set to the second direction, and the first-time light irradiation is performed through the wavelength selection filter 235 (not illustrated) and the polarizer 230A using the first light irradiation mechanism 280A. The first direction and the second direction were parallel to each other. Portions that should not be irradiated with light are shielded from light with a light-shielding component 240A. The polarization axis 231A of the polarizer 230A included in the first light irradiation mechanism 280A is set to the +45° azimuth clockwise with respect to the light irradiation direction 252, and then the rotation adjustment mechanism 260A adjusts the light exposure direction 253A on the surface of the liquid crystal display panel substrate 30 to substantially 45° with respect to the light irradiation direction 252. Then, the first-time light irradiation is performed. Subsequently, using the second light irradiation mechanism 280E, the second-time light irradiation is performed through the wavelength selection filter 235 (not illustrated) and the polarizer 230E. In the polarizer 230E included in the second light irradiation mechanism 280E, the polarization axis 231E is set to the −45° azimuth counterclockwise with respect to the light irradiation direction 252, and the azimuth of the polarization axis 231E is different from the azimuth of the polarization axis 231A by 900. The polarization axis 231E is adjusted by the rotation adjustment mechanism 260E such that the exposure direction 253E on the surface of the liquid crystal display panel substrate 30 becomes substantially 45° with respect to the light irradiation direction 252. Then, the second-time light irradiation is performed. A second light-shielding component 240E shields the light in a range different from that of the first light-shielding component 240A. Then, the substrate is rotated by 180°, the first light-shielding component 240A is moved, and the third-time light irradiation is performed using the first light irradiation mechanism 280A while the polarization axis 231A of the polarizer 230A is kept at the +45° azimuth. Finally, the second light-shielding component 240E is moved, and the fourth-time light irradiation is performed using the second light irradiation mechanism 280E while the polarization axis 231E of the polarizer 230E is kept at the −45° azimuth. The moving direction 251 of the TFT substrate and the light irradiation direction 252 are the same in all the first to fourth light irradiation treatments. In all of the first-time to fourth-time light irradiation, the polarization axis 231A and the polarization axis 231E are adjusted by the rotation adjustment mechanism 260A or 260E such that the exposure direction 253A or 253E on the surface of the liquid crystal display panel substrate 30 becomes substantially 45° with respect to the light irradiation direction 252. In the liquid crystal display panel substrate 30 subjected to the light irradiation, pre-tilt azimuths 253A and 253E vary in each of regions corresponding to the four alignment regions formed in one pixel.

A light irradiation angle θ1 at which the liquid crystal display panel substrate 30 is irradiated with the light from the light source 220 of the first light irradiation mechanism 280A and a light irradiation angle 82 at which the liquid crystal display panel substrate 30 is irradiated with the light from the light source 220 of the second light irradiation mechanism 280E may be identical to or different from each other. Preferably a difference between θ1 and θ2 is less than or equal to 0.5°.

In Embodiment 3, the photo-alignment treatment device includes the two light irradiation mechanisms. However, the photo-alignment treatment device may include three or four light irradiation mechanisms. For example, in the case of using the photo-alignment treatment device including four light irradiation mechanisms, the light irradiation can be performed by different light irradiation mechanisms in each of the regions corresponding to four alignment regions.

The photo-alignment treatment device for a liquid crystal display panel substrate of Embodiments 1 to 3 and the methods for manufacturing a liquid crystal display panel using these photo-alignment treatment devices are described above. An example of the liquid crystal display panel obtained using the photo-alignment treatment device and the method for manufacturing a liquid crystal display panel will be described below.

In the liquid crystal display panel, the alignment of the liquid crystal molecule becomes irregular at a boundary between the regions in which the alignment azimuths of the liquid crystal molecules are different from each other. In performing the liquid crystal display, the region where the alignment of the liquid crystal molecule becomes irregular does not transmit the light and therefore visually recognized as a dark line, which decreases transmittance to degrade response performance. For this reason, in the case of dividing one pixel into multiple alignment regions, increasing the number of alignment regions formed in each alignment region enhances the viewing angle characteristics, but also unfortunately increases the number of regions with irregular alignment of liquid crystal molecules, whereby the number of regions observed as dark lines tends to increase. The recent increase in definition of pixels requires reduction in area per pixel. The area of dark lines, however, remains the same even when the size of pixels is reduced, and thus the proportion of the area of dark lines in a pixel increases. Hence, more studies are needed to achieve favorable viewing angle characteristics and a high transmittance while responding to the increase in definition.

Figure 16:
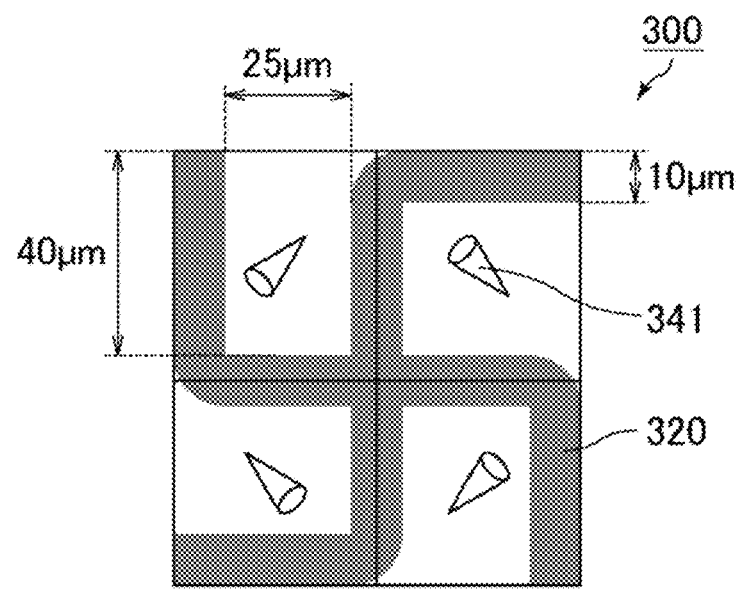
FIG. 16 is a schematic plan view of a half pixel illustrating an example of a dark line generation region in a conventional 4D-RTN mode liquid crystal display panel.
Figure 17:
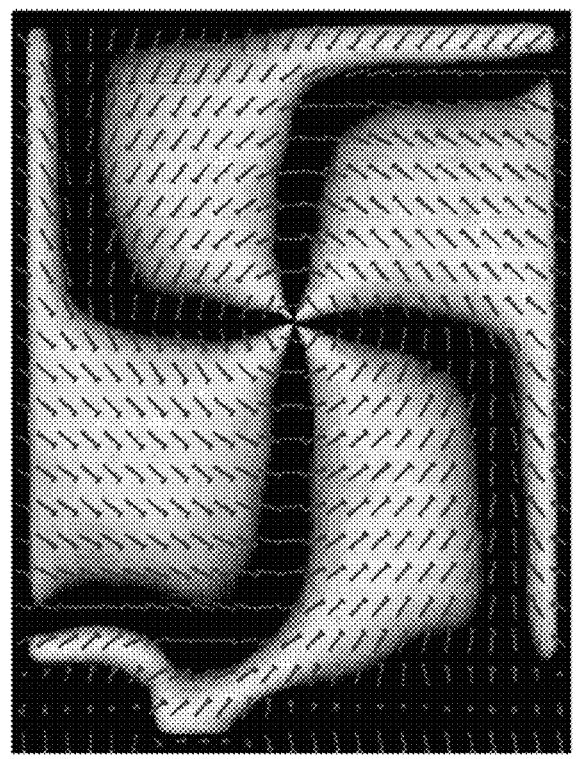
FIG. 17 is a photograph of a half pixel illustrating a simulation result of dark line generation in the conventional 4D-RTN mode liquid crystal display panel.
Figure 19:
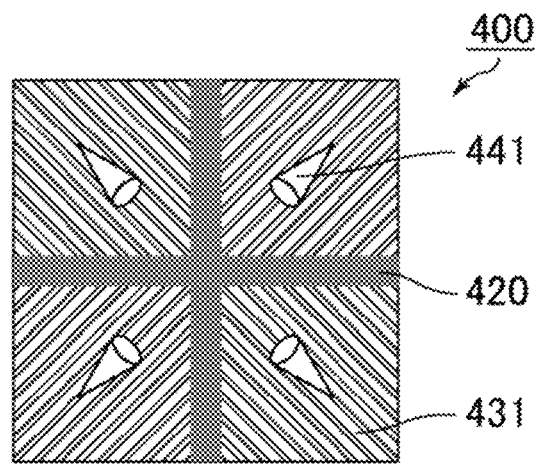
FIG. 19 is a schematic plan view of a half pixel illustrating another example of the dark line generation region in the conventional 4D-RTN mode liquid crystal display panel.

As illustrated in FIG. 16, in the conventional 4D-RTN mode liquid crystal display panel 300, the alignment of the liquid crystal molecule becomes irregular near an outer edge of the pixel and at the boundary between the alignment regions, and a swastika dark line 320 is generated. The present inventors have further simulated generation of dark lines and observed the alignment state of the liquid crystal molecules. FIG. 17 is a photograph of a half pixel illustrating a simulation result of the dark line generation in the conventional 4D-RTN mode liquid crystal display panel. As can be seen from FIG. 17, the alignment of the liquid crystal molecule becomes irregular near the outer edge of the pixel and at the boundary between the alignment regions, and the dark line is generated. For this reason, a proportion of the region where the liquid crystal molecules other than the dark line are regularly aligned becomes small, and the transmittance is decreased. As illustrated in FIG. 19, in the conventional 4D-RTN liquid crystal display panel 400, disorder of the alignment of the liquid crystal molecule is prevented by an electrode configuration of the pixel electrode. For this reason, the region where the alignment of the liquid crystal molecules is irregular decreases, and the decrease in transmittance can be prevented. However, a cross-shaped dark line 420 is generated although the width of the dark line can be narrowed.

The inventors of the present invention have made studies on the method for dividing a pixel into multiple alignment regions while reducing generation of dark lines in a vertical alignment mode liquid crystal display panel.

The inventors have then found that the viewing angle characteristics can be achieved by forming four alignment regions providing different tilt azimuths to liquid crystal molecules in a pixel, specifically by forming alignment regions providing tilt azimuths of substantially 45°, 135°, 225°, and 315° to liquid crystal molecules in the four alignment regions, with the azimuth in the lateral direction of the pixels being defined as 0°. The inventors have further studied the formation method and arrangement of four alignment regions which can prevent generation of dark lines. As a result, the inventors have found a new alignment control mode that can reduce generation of dark lines while responding to the increase in definition. The alignment control mode aligns the liquid crystal molecules at a twist angle of substantially 0° in each of the four alignment regions and arranges the four alignment regions in the longitudinal direction of the pixel, in a plan view of the liquid crystal display panel. Consequently, the generation of the dark line can be prevented to improve the transmittance.

In the photo-alignment treatment device for a liquid crystal display panel substrate of Embodiments 1 to 3, the azimuth of the polarization axis of the polarizer with respect to the light irradiation direction and the exposure direction on the surface of the liquid crystal display panel substrate are matched with each other by the rotation adjustment mechanism, so that the exposure direction on the surface of the liquid crystal display panel substrate can be adjusted to be substantially 45° with respect to the light irradiation direction. The alignment treatment can be performed by the scanning exposure, so that the photo-alignment treatment can efficiently be performed on the alignment film. For this reason, the photo-alignment treatment device for a liquid crystal display panel substrate of Embodiments 1 to 3 and the method for manufacturing a liquid crystal display panel using the photo-alignment treatment device can suitably be used to manufacture a new alignment control mode liquid crystal display panel including four alignment regions in which the tilt azimuths of the liquid crystal molecules become substantially 45°, 135°, 225°, and 315° when the azimuth in the lateral direction of the pixel is defined as 0°.

In the photo-alignment treatment device for a liquid crystal display panel substrate of Embodiments 1 to 3 and a liquid crystal display panel 100 obtained by the method for manufacturing a liquid crystal display panel using the photo-alignment treatment device, the liquid crystal display panel 100 may sequentially include: the first substrate including the pixel electrode; the first vertical alignment film; a liquid crystal layer containing liquid crystal molecules; the second vertical alignment film; and the second substrate including the counter electrode, the liquid crystal display panel may include a pixel in which four alignment regions having different tilt azimuths of the liquid crystal molecules are arranged along a longitudinal direction of the pixel, the pixel includes a first alignment region having a tilt azimuth of substantially 45°, a second alignment region having a tilt azimuth of substantially 135°, a third alignment region having a tilt azimuth of substantially 225°, and a fourth alignment region having a tilt azimuth of substantially 315°, where the azimuth along a lateral direction of the pixel is defined as 0°, the liquid crystal molecules may be aligned substantially perpendicularly to the first vertical alignment film and the second vertical alignment film and tilted along the tilt azimuths when no voltage is applied to the liquid crystal layer, the liquid crystal molecules may be more greatly tilted along the tilt azimuths when voltage is applied to the liquid crystal layer, and the liquid crystal molecules may have a twist angle of substantially 0° in each of the four alignment regions in a plan view of the liquid crystal display panel. The "azimuth" as used herein means a direction in a view projected on a substrate surface without consideration of the tilt angle (i.e., polar angle, pre-tilt angle) from the normal direction of the substrate surface. For example, if an x-axis and a y-axis perpendicular to the x-axis form an xy plane parallel to the substrate surfaces and the x-axis direction is defined as 0°, the azimuth is determined counterclockwise in a positive value. The "tilt azimuth" as used herein means an azimuth at which liquid crystal molecules tilt relative to the first substrate. The term "tilt azimuths of substantially 45°, substantially 135°, substantially 225°, and substantially 315°" with the azimuth along the lateral direction of the pixels defined as 0° refer to the range up to an angle of 15°, preferably an angle of 5°, from 45°, 135°, 225°, and 315° clockwise or counterclockwise with the azimuth along the lateral direction of the pixels defined as 0°.

According to the photo-alignment treatment device for a liquid crystal display panel substrate of Embodiments 1 to 3 and the method for manufacturing a liquid crystal display panel using the photo-alignment treatment device, the four alignment regions having different tilt azimuths of the liquid crystal molecules can be formed by a simple method while the moving direction of the substrate or the light source is kept in parallel with the light irradiation direction. The liquid crystal display panel is a high-transmittance liquid crystal display panel in which the generation of the dark line is prevented.

Figure 7:
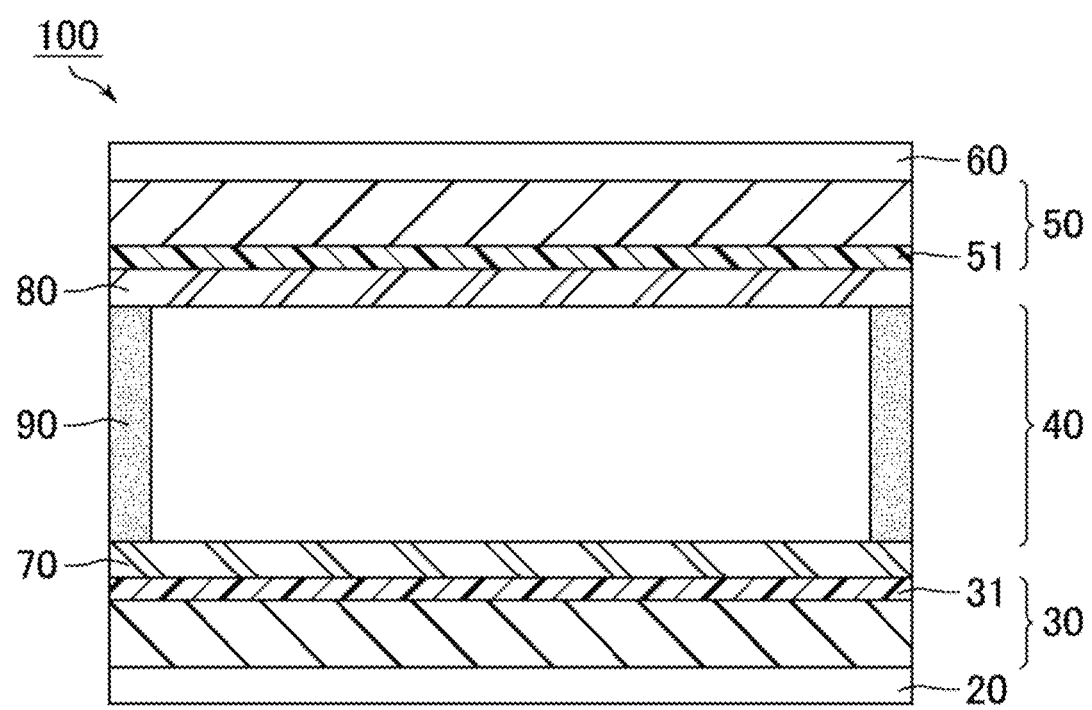
FIG. 7 is a sectional view schematically illustrating an example of a liquid crystal display panel obtained by a method for manufacturing a liquid crystal display panel using the photo-alignment treatment device of Embodiments 1 to 3.

An example of the liquid crystal display panel obtained by the method for manufacturing a liquid crystal display panel will be described below with reference to FIGS. 7 and 8. The liquid crystal display panel substrate 30 may be any one of the first substrate 30 and the second substrate 50. FIG. 7 is a sectional view schematically illustrating an example of the liquid crystal display panel obtained by the method for manufacturing a liquid crystal display panel using the photo-alignment treatment device of Embodiments 1 to 3, and FIG. 8 is a schematic plan view of the liquid crystal display panel in FIG. 7. As illustrated in FIG. 7, the liquid crystal display panel 100 of the embodiment includes in the given order the first substrate 30 including a pixel electrode 31, the first vertical alignment film 70, a liquid crystal layer 40 containing liquid crystal molecules, a second vertical alignment film 80, and the second substrate 50 including a counter electrode 51. The liquid crystal layer 40 is surrounded by a sealing material 90. As illustrated in FIG. 7, the liquid crystal display panel 100 of the embodiments includes pixels 10 arranged into a matrix shape. In the drawings, the liquid crystal molecules are depicted as cones whose base is oriented to the observer.

The first substrate 30 includes the pixel electrodes 31 and may be, for example, an active matrix substrate (TFT substrate). The TFT substrate can be one commonly used in the field of liquid crystal display panels. The first substrate 30 may further include a gate signal line 11 (signal line), and the signal line may be disposed so as to cross the pixels 10 in the lateral direction. The TFT substrate may have a configuration in which multiple parallel source signal lines; multiple parallel gate signal lines extending in a direction orthogonal to the source signal line and are formed in parallel with each other; an active element such as a TFT 13 arranged at an intersection of the source signal line and the gate signal line; and the pixel electrodes 31 arranged in a matrix shape in a region defined by the source signal line and the gate signal line are provided on a transparent substrate in a plan view.

The liquid crystal layer 40 contains liquid crystal molecules 41. Liquid crystal molecules are aligned in the direction substantially perpendicular to the first substrate 30 and the second substrate 50 at a tilt in the respective tilt azimuth directions with no voltage applied to the liquid crystal layer 40 and may be more greatly tilted in the respective tilt azimuth directions upon application of voltage to the liquid crystal layer 40. Here, the liquid crystal display panel can provide display when the liquid crystal molecules are more greatly tilted in the respective tilt azimuth directions. The liquid crystal molecules near the outer edge of each pixel are aligned from the outside to the inside of the pixel, while the liquid crystal molecules near the center of the pixel are tilted at an azimuth in the alignment treatment direction upon application of voltage to the liquid crystal layer 40.

The liquid crystal molecule 41 may have negative anisotropy ($\Delta\varepsilon$) of dielectric constant defined by the following formula (1), or have a positive value. That is, the liquid crystal molecule 41 may have the negative anisotropy of dielectric constant or the positive anisotropy of dielectric constant.

$$\Delta\varepsilon = \text{(dielectric constant in major axis direction)} - \text{(dielectric constant in minor axis direction)} \quad (1)$$

Figure 9:
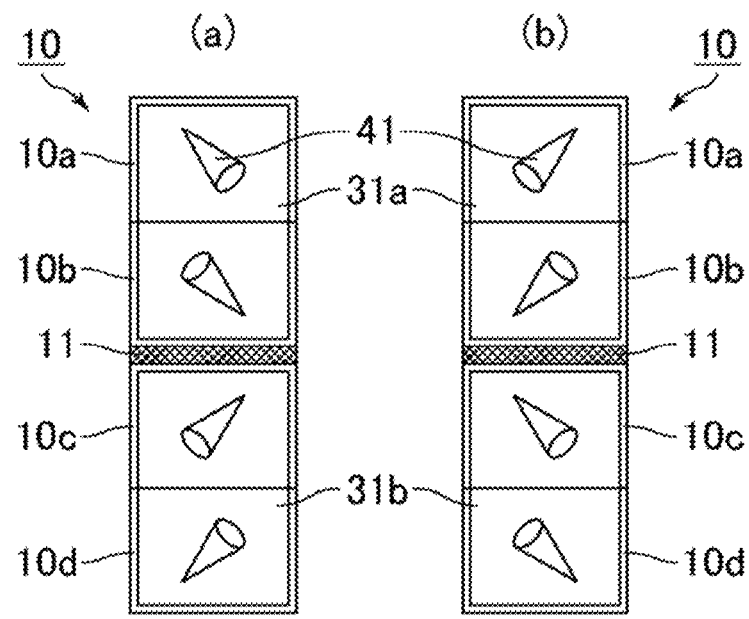
FIG. 9 is an example of a relationship between a pixel electrode and an alignment region in the liquid crystal display panel in FIG. 8.

FIG. 9 is a schematic plan view of one pixel illustrating an example of a relationship between a pixel electrode and an alignment region in the liquid crystal display panel in FIG. 8. As illustrated in FIG. 9, the pixel 10 includes four alignment regions 10a, 10b, 10c, and 10d having different tilt azimuths of the liquid crystal molecule 41 and are arranged in a longitudinal direction of the pixel 10, and the pixel includes a first alignment region having a tilt azimuth of substantially 45°, a second alignment region having a tilt azimuth of substantially 135°, a third alignment region having a tilt azimuth of substantially 225°, and a fourth alignment region having a tilt azimuth of substantially 315°, where the azimuth along a lateral direction of the pixel is defined as 0°. The transmittance of a pixel reaches the highest when the tilt azimuth of the liquid crystal molecules forms an angle of 45° with the polarization axis of the polarizing plate. Hence, the transmittance can be made highest by setting the azimuth in the lateral direction of the pixel 10 and the polarization axis of one of the polarizing plates to be parallel to each other and providing tilt azimuths of 45°, 135°, 225°, and 315° to liquid crystal molecules, with the azimuth in the lateral direction of the pixels defined as 0°. The first alignment region, the second alignment region, the third alignment region, and the fourth alignment region may be arranged in any order.

The four alignment regions may include two alignment regions which provide tilt azimuths substantially 180° different from each other to the liquid crystal molecules and are arranged next to each other. With two alignment regions which provide tilt azimuths substantially 180° different from each other to the liquid crystal molecules and are arranged next to each other, the viewing angle characteristics can be made favorable. More preferably, a signal line 11 that crosses the pixel 10 along the lateral direction to divide the pixel 10 into two pieces may be provided, the pixel 10 may include two alignment regions of the four alignment regions in at least one of the two alignment division pieces divided and formed by the signal line 11, or the tilt azimuths of the liquid crystal molecules may be different from each other by substantially 180° in the two alignment regions included in the alignment division unit. The "substantially 180°" means the range up to an angle of 15°, preferably an angle of 5°, from the 180° point in the clockwise or counterclockwise direction.

From the viewpoint of decreasing the number of dark lines to improve a viewing angle characteristic, each pixel may include, in the longitudinal direction of the pixels, the four alignment regions 10a, 10b, 10c, and 10d in an alignment division pattern (Pattern A) in which the fourth alignment region having a tilt azimuth of substantially 315°, the second alignment region having a tilt azimuth of substantially 135°, the third alignment region having a tilt azimuth of substantially 225°, and the first alignment region having a tilt azimuth of substantially 45° are sequentially arranged as illustrated in FIG. 9(a), or in an alignment division pattern (Pattern B) in which the third alignment region having a tilt azimuth of substantially 225°, the first alignment region having a tilt azimuth of substantially 45°, the fourth alignment region having a tilt azimuth of substantially 315°, and the second alignment region having a tilt azimuth of substantially 135° are sequentially arranged as illustrated in FIG. 9(b). In the case where the alignment division pattern is Pattern A, the signal line 11 may be arranged between the second alignment region and the third alignment region. In the case where the alignment division pattern is Pattern B, the signal line 11 may be arranged between the first alignment region and the fourth alignment region.

In the liquid crystal display panel of the present embodiment, the pixels in the row direction and the column direction may consecutively have only Pattern A or may consecutively have only Pattern B. The liquid crystal display panel 100 may include a different pixel disposed adjacent to the pixel 10 in the lateral direction, the different pixel may include the first alignment region, the second alignment region, the third alignment region, and the fourth alignment region, and the pixel 10 and the different pixel may be identical to each other in the arrangement order of the four alignment regions along the longitudinal direction. In this case, alignment regions providing the same tilt azimuth to liquid crystal molecules are arranged in the row direction of the liquid crystal display panel, so that photo-alignment treatment by scanning exposure can be performed and thus the productivity is increased.

The pixel electrodes 31 may each include the first pixel electrode 31a configured to apply voltage to two alignment regions 10a and 10b arranged next to each other among the four alignment regions 10a, 10b, 10c, and 10d and the second pixel electrode 31b configured to apply voltage to the other two alignment regions 10c and 10d arranged next to each other, and the first pixel electrode 31a and the second pixel electrode 31b may be configured to apply different voltages to the liquid crystal layer 40.

Figure 10:
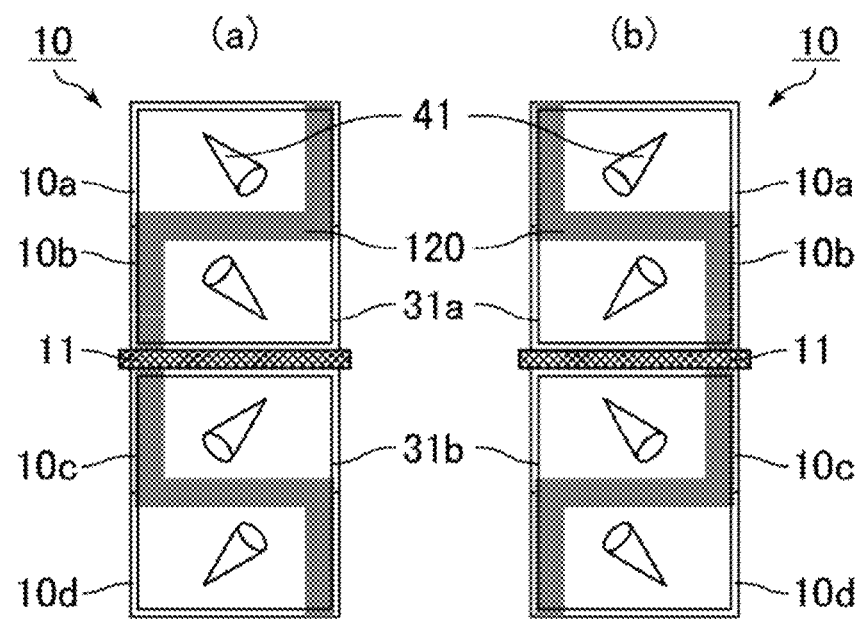
FIG. 10 is a schematic plan view of one pixel illustrating an example of a dark line generation region in the liquid crystal display panel in FIG. 8.

FIG. 10 is a schematic plan view of one pixel illustrating an example of the dark line generation region in the liquid crystal display panel in FIG. 8. FIG. 10(a) illustrates the case that the alignment division pattern is the pattern A, and FIG. 10(b) illustrates the case that the alignment division pattern is the pattern B. The dark line is generated in the region where the alignment of the liquid crystal molecule becomes irregular because the region does not transmit the light. As illustrated in FIG. 10, the alignment of the liquid crystal molecule 41 is likely to be disturbed at the boundary between the pixels and the boundary between the alignment regions, which generates the dark line 120.

The first vertical alignment film 70 and the second vertical alignment film 80 each have a function of controlling the alignment of the liquid crystal molecules 41 in the liquid crystal layer 40. When the voltage applied to the liquid crystal layer 40 is lower than the threshold voltage (including the case of no voltage application), the liquid crystal molecules are aligned in the direction substantially perpendicular to the first vertical alignment film 70 and the second vertical alignment film 80 and at a tilt in the respective tilt azimuth directions by the functions of the first vertical alignment film 70 and the second vertical alignment film 80. Specifically, the first vertical alignment film 70 can align the liquid crystal molecules at 85.0° to 89.0° relative to the first substrate 30, for example, while the second vertical alignment film 80 can align the liquid crystal molecules at 85.0° to 89.0° relative to the second substrate 50, for example.

The first vertical alignment film 70 and the second vertical alignment film 80 may be photo-alignment films formed of a photo-alignment material. The photo-alignment material encompasses general materials that undergo structural change when irradiated with light (electromagnetic waves) such as ultraviolet light or visible light, and thereby exhibit an ability of controlling the alignment of the nearby liquid crystal molecules (alignment controlling force) or change the alignment controlling force level and/or direction.

The first vertical alignment film 70 and the second vertical alignment film 80 are subjected to the photo-alignment treatment, which allows a pre-tilt angle to be provided to the liquid crystal molecule. The photo-alignment treatment can be performed by obliquely irradiating the first substrate 30 provided with the first vertical alignment film 70 on the surface and the second substrate 50 provided with the second vertical alignment film 80 on the surface with the light from the light source.

In a plan view of the liquid crystal display panel, the twist angle of the liquid crystal molecules is substantially 0° in each of the four alignment regions 10a, 10b, 10c, and 10d. In other words, liquid crystal molecules near the center of the liquid crystal layer in the thickness direction as well as liquid crystal molecules near the first vertical alignment film 70 and near the second vertical alignment film 80 are at the same tilt azimuth. That is, in a plan view of the liquid crystal display panel, in each of the four alignment regions 10a, 10b, 10c, and 10d, the pre-tilt azimuth provided by the first vertical alignment film 70 and the pre-tilt azimuth provided by the second vertical alignment film 80 are different from each other by substantially 180°, are in the opposite directions, and are parallel to each other. For example, in the alignment region 10a, the first vertical alignment film 70 provides a pre-tilt azimuth of 315° and the second vertical alignment film 80 provides a pre-tilt azimuth of 135°. This configuration can differentiate the tilt azimuths of the liquid crystal molecules 41 in the four alignment regions 10a, 10b, 10c, and 10d. The pre-tilt azimuth provided by the first vertical alignment film 70 is the azimuth of the tilt of liquid crystal molecules from the first vertical alignment film 70 when no voltage is applied to the liquid crystal layer. The pre-tilt azimuth provided by the second vertical alignment film 80 is the azimuth of the tilt of liquid crystal molecules from the second vertical alignment film 80 when no voltage is applied to the liquid crystal layer. The expression "substantially 0°" means the range up to an angle of 15°, preferably an angle of 5°, from the 0° point in the clockwise or counterclockwise direction.

The second substrate 50 includes the counter electrode 51, and may be, for example, a color filter substrate (CF substrate). The color filter substrate can be one commonly used in the field of liquid crystal display panels.

A first polarizing plate 20 may be formed on or adjacent to the surface of the first substrate 30 opposite to the liquid crystal layer 40, and a second polarizing plate 60 may be formed on or adjacent to the surface of the second substrate 50 opposite to the liquid crystal layer 40. The polarization axis of the first polarizing plate 20 and the polarization axis of the second polarizing plate 60 may be perpendicular to each other. For example, the first polarizing plate 20 and the second polarizing plate 60 may be arranged such that one of the polarization axes is parallel to the long sides of the pixels 10 and the other polarization axis is perpendicular to the long sides of the pixels 10. Here, the polarization axis may be an absorption axis or a transmission axis of a polarizing plate.

In the liquid crystal display panel 100 of the present embodiment, typically, the first substrate 30 and the second substrate 50 are bonded to each other by the sealing material 90 provided to surround the liquid crystal layer 40, so that the liquid crystal layer 40 is held in a predetermined region.

The liquid crystal display panel 100 of the present embodiment may be a liquid crystal display device including a backlight at the backside. A liquid crystal display device having such a configuration is typically called a transmissive liquid crystal display device. The backlight may be any backlight that emits light including only visible light or light including both visible light and ultraviolet light. A backlight that emits white light is suitably used in order to perform color display on the liquid crystal display device.

The liquid crystal display device has a configuration including, as well as the liquid crystal display panel and the backlight, multiple components including external circuits such as a tape-carrier package (TCP) and a printed circuit board (PCB); optical films such as a viewing angle-increasing film and a luminance-increasing film; and a bezel (frame). Some components, if appropriate, may be incorporated into another component. Components other than those described above are not particularly limited and are not described here because such components can be those commonly used in the field of liquid crystal display devices.

Hereinabove, embodiments of the present invention are described. Each and every detail described for the above embodiments of the present invention should be applied to all the aspects of the present invention.

The present invention is described in more detail below based on examples and comparative examples. The present invention, however, is not limited to these examples.

Example 1

In Example 1, the photo-alignment treatment was performed using the photo-alignment treatment device 1000 for a liquid crystal display panel substrate of Embodiment 1 to prepare the liquid crystal display panel in which the tilt azimuths of the liquid crystal molecules in the four alignment regions were arranged in the order of substantially 315°, substantially 135°, substantially 215°, and substantially 45°, where the azimuth along the lateral direction of the pixel is defined as 0°.

First, a TFT substrate including components such as TFTs, pixel electrodes, and signal lines and a CF substrate including components such as a black matrix, color filters, and a counter electrode were prepared. An alignment film solution was applied to the surface of each of the TFT substrate and the CF substrate, and the substrates were heated at 80° C. or lower, followed by heating at 230° C. for post-baking. Thereby, vertical alignment films were formed. The solids components in the alignment film solution were a polymer material mainly having a polysiloxane structure with a cinnamate group functioning as a photo functional group in a side chain and polyamic acid. Such vertical alignment films can also be produced by, for example, applying an alignment film solution containing polyamic acid as its solids component to the surface of each of the TFT substrate and the CF substrate, heating the substrates at 80° C. or lower, and heating the substrates at 200° C. for post-baking.

Subsequently, the photo-alignment treatment was performed on the TFT substrate and CF substrate provided with the vertical alignment film. The photo-alignment treatment was performed by the scanning exposure using the photo-alignment treatment device of Embodiment 1 in FIG. 1. The intensity of the light emitted from the light source was 20 mJ/cm$^2$. The photo-alignment treatment device of Example 1 included the wavelength selection filter between the light source and the polarizer, the light emitted through the wavelength selection filter was linearly polarized light, and the light had a dominant wavelength of 313 nm. The wire grid polarizer having an extinction ratio of 100:1 was used as the polarizer. The light irradiation angle with respect to the TFT substrate and the CF substrate was set to 40°. A filter having a dominant wavelength of 280 nm to 400 nm of the light emitted through the wavelength selection filter was used as the wavelength selection filter.

Figure 11:
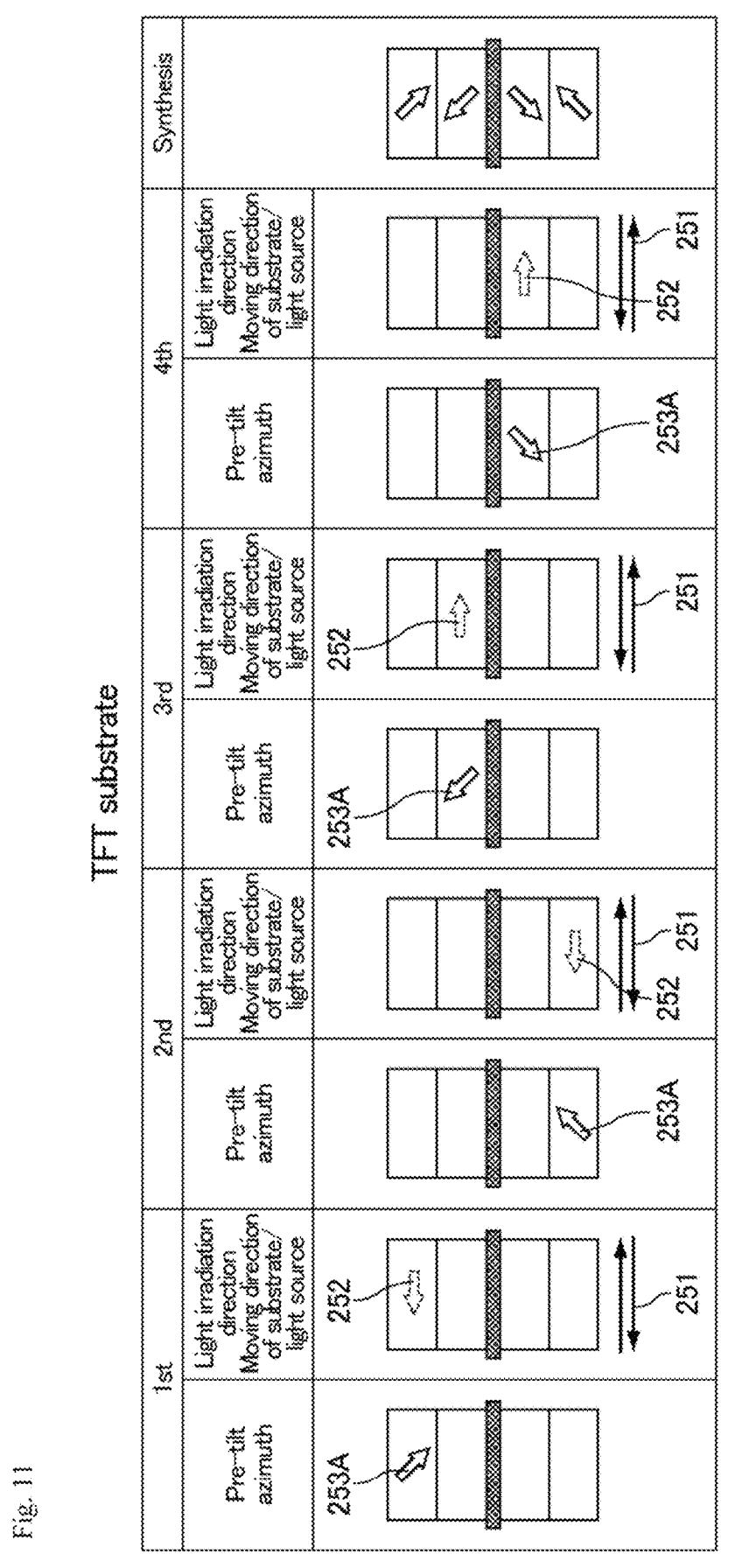

An example of the photo-alignment treatment for the TFT substrate in the liquid crystal display panel of Example 1 will be described below with reference to FIGS. 2 and 11. FIG. 11 is a view illustrating an example of the photo-alignment treatment for the TFT substrate in the liquid crystal display panel of Example 1. As illustrated in FIG. 11, the moving direction 251 of the TFT substrate was set to the first direction, the light irradiation direction 252 was set to the second direction, and the first-time light irradiation was performed. The first direction and the second direction were parallel to each other. As illustrated in FIG. 2, the polarization axis 231A of the polarizer 230A was disposed at the +45° azimuth clockwise with respect to the light irradiation direction 252. Portions that should not be irradiated with light were shielded from light with a light-shielding component. The polarization axis 231A was adjusted by the rotation adjustment mechanism 260A such that the exposure direction 253A on the TFT substrate surface was set to substantially 45° with respect to the light irradiation direction 252, and then the first-time light irradiation was performed. Subsequently, the light shielding member was moved, the polarization axis 231A was rotated by 90° from the +45° azimuth using the rotation mechanism 264, and set to the −45° azimuth counterclockwise with respect to the light irradiation direction 252, and the polarization axis 231A was adjusted by the rotation adjustment mechanism 260A. Then, the second-time light irradiation was performed. In the second-time light irradiation, the moving direction 251 of the TFT substrate was set to the first direction, and the light irradiation direction 252 was set to the second direction. Subsequently, the light shielding member was moved, the polarization axis 231 of the polarizer was rotated by 90° from the −45° azimuth using the rotation mechanism 264, and set to the +45° azimuth, and the polarization axis 231A was adjusted by the rotation adjustment mechanism 260A. Then, the moving direction 251 of the TFT substrate was set to the second direction, the light irradiation direction 252 was set to the first direction, and the third-time light irradiation was performed. Finally, the light shielding member was moved, the polarization axis 231A was rotated by 90° from the +45° azimuth using the rotation mechanism 264, and set to the −45° azimuth, and the polarization axis 231A was adjusted by the rotation adjustment mechanism 260A. Then, the moving direction 251 of the TFT substrate was set to the second direction, the light irradiation direction 252 was set to the first direction, and the fourth-time light irradiation was performed. In the TFT substrate subjected to the light irradiation, the pre-tilt azimuth 253A varies in each of regions corresponding to the four alignment regions.

Figure 12:
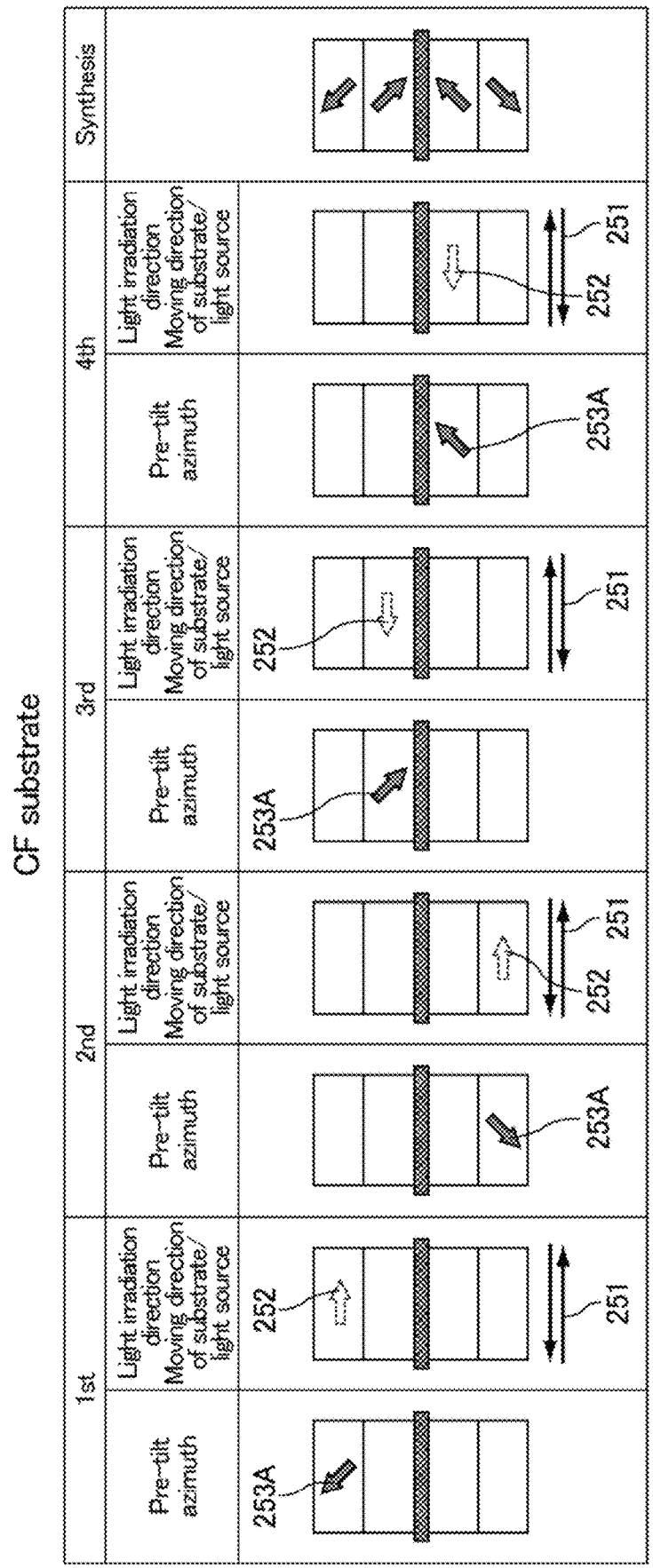
FIG. 12 is a view illustrating an example of photo-alignment treatment for a CF substrate in the liquid crystal display panel of Example 1.

An example of the photo-alignment treatment for the CF substrate in the liquid crystal display panel of Example 1 will be described below with reference to FIGS. 2 and 12. FIG. 12 is a view illustrating an example of photo-alignment treatment for a CF substrate in the liquid crystal display panel of Example 1. As illustrated in FIG. 12, the moving direction 251 of the CF substrate was set to the second direction, the light irradiation direction 252 was set to the first direction, and the first-time light irradiation was performed. As illustrated in FIG. 2, the polarization axis 231A of the polarizer 230A was disposed at the +45° azimuth clockwise with respect to the light irradiation direction 252. Portions that should not be irradiated with light were shielded from light with a light-shielding component. The polarization axis 231A was adjusted by the rotation adjustment mechanism 260A such that the exposure direction 253A on the CF substrate surface was set to substantially 45° with respect to the light irradiation direction 252, and then the first-time light irradiation was performed. Subsequently, the light shielding member was moved, the polarization axis 231A was rotated by 90° from the +45° azimuth using the rotation mechanism 264, and set to the −45° azimuth counterclockwise with respect to the light irradiation direction 252, and the polarization axis 231A was adjusted by the rotation adjustment mechanism 260A. Then, the second-time light irradiation was performed. In the second-time light irradiation, the moving direction 251 of the CF substrate was set to the second direction, and the light irradiation direction 252 was set to the first direction. Subsequently, the light shielding member was moved, the polarization axis 231A was rotated by 90° from the −45° azimuth using the rotation mechanism 264, and set to the +45° azimuth, and the polarization axis 231A was adjusted by the rotation adjustment mechanism 260A. Then, the moving direction 251 of the CF substrate was set to the first direction, the light irradiation direction 252 was set to the second direction, and the third-time light irradiation was performed. Finally, the light shielding member was moved, the polarization axis 231A was rotated by 90° from the +45° azimuth using the rotation mechanism 264, and set to the −45° azimuth, and the polarization axis 231A was adjusted by the rotation adjustment mechanism 260A. Then, the moving direction 251 of the CF substrate was set to the first direction, the light irradiation direction 252 was set to the second direction, and the fourth-time light irradiation was performed. In the CF substrate subjected to the light irradiation, the pre-tilt azimuth 253A varies in each of regions corresponding to the four alignment regions.

A liquid crystal composition containing liquid crystal molecules was dropped onto the TFT substrate. Lines of a heat/visible light-curable sealing material were drawn on the CF substrate using a dispenser. The TFT substrate and the CF substrate were then bonded to each other such that the pre-tilt azimuths provided by the vertical alignment film formed on the surface of the TFT substrate and the pre-tilt azimuths provided by the vertical alignment film formed on the surface of the CF substrate were in opposite directions and parallel to each other. Between the substrates was sealed the liquid crystal composition. In a plan view of the resulting liquid crystal display panel, the twist angle of the liquid crystal molecules is substantially 0° in each of the four alignment regions.

To the back surface (surface on which light from the backlight is incident) of the TFT substrate and the viewing surface (surface from which the light from the backlight is emitted) of the CF substrate were attached paired polarizing plates such that the polarization axes were in crossed Nicols, whereby the liquid crystal display panel of Example 1 was completed. The polarizing plates were arranged such that the polarization axis of one of the plates was parallel to the long sides of the pixels and the polarization axis of the other plate was perpendicular to the long sides of the pixels.

A backlight including white LEDs was bonded to the back surface of the liquid crystal display panel, so that a liquid crystal display device was produced. In Example 1, the exposure directions on the surfaces of the TFT substrate and the CF substrate can be adjusted to be substantially 45° with respect to the light irradiation direction, and the tilt azimuth of the liquid crystal molecule can be set to the target angle.

Figure 13:
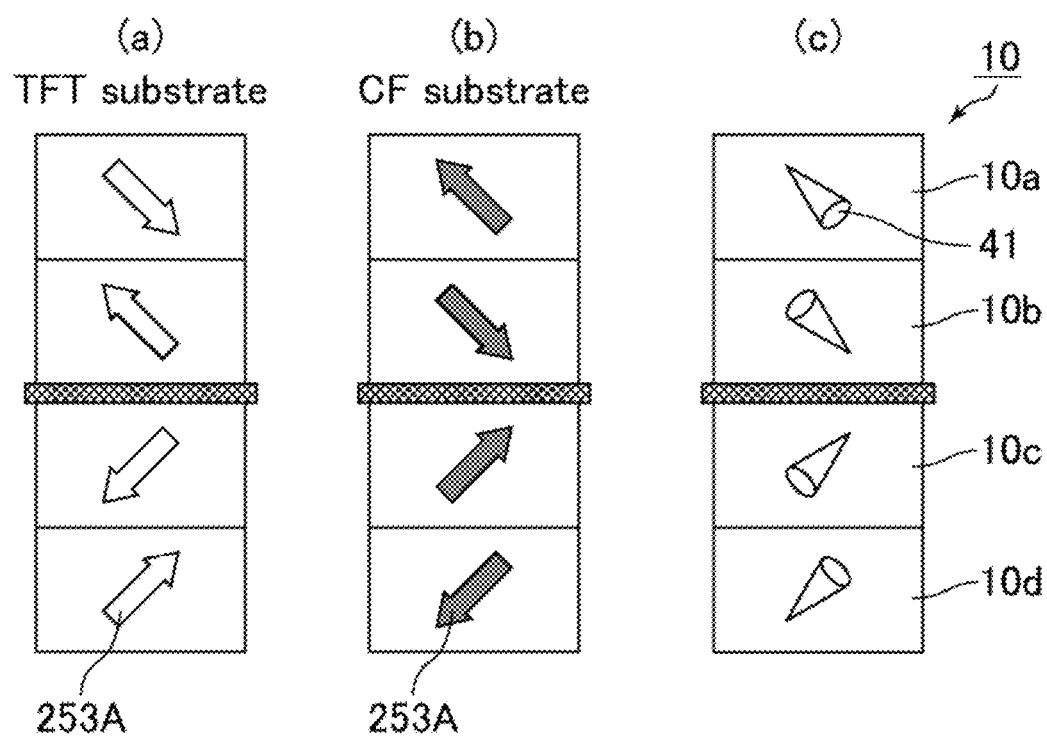
FIG. 13 is a schematic plan view illustrating pre-tilt azimuths of the TFT substrate and the CF substrate and tilt azimuths of liquid crystal molecules in the liquid crystal display panel of Example 1.

FIG. 13 is a schematic plan view illustrating the pre-tilt azimuths of the TFT substrate and the CF substrate and the tilt azimuths of the liquid crystal molecules in the liquid crystal display panel of Example 1. FIG. 13(a) illustrates the pre-tilt azimuth of the TFT substrate, FIG. 13(b) illustrates the pre-tilt azimuth of the CF substrate, and FIG. 13(c) illustrates the tilt azimuths of the liquid crystal molecules in the respective alignment regions when voltage is applied. As illustrated in FIGS. 13(a) and 13(b), in a plan view of the liquid crystal display panel, the pre-tilt azimuth 253A provided by the vertical alignment film formed on the surface of the TFT substrate and the pre-tilt azimuth 253A provided by the vertical alignment film formed on the surface of the CF substrate are in opposite directions and parallel to each other in each of the four alignment regions 10a, 10b, 10c and 10d. In a plan view of the resulting liquid crystal display panel, the twist angle of the liquid crystal molecules is substantially 0° in each of the four alignment regions. As illustrated in FIG. 13(c), in Example 1, the pixel 10 was constructed with the alignment division pattern in which, when the azimuth along the lateral direction of the pixel is defined as 0°, a fourth alignment region where the tilt azimuth of the liquid crystal molecule 41 was set to substantially 315°, a second alignment region where the tilt azimuth of the liquid crystal molecule 41 was set to substantially 135°, a third alignment region where the tilt azimuth of the liquid crystal molecule 41 was set to substantially 225°, and a first alignment region where the tilt azimuth of the liquid crystal molecule 41 was set to substantially 45°, were arranged in the order. In Example 1, a liquid crystal display panel was produced in which pixels having the same alignment pattern were arranged both in the row direction and the column direction.

Figure 14:
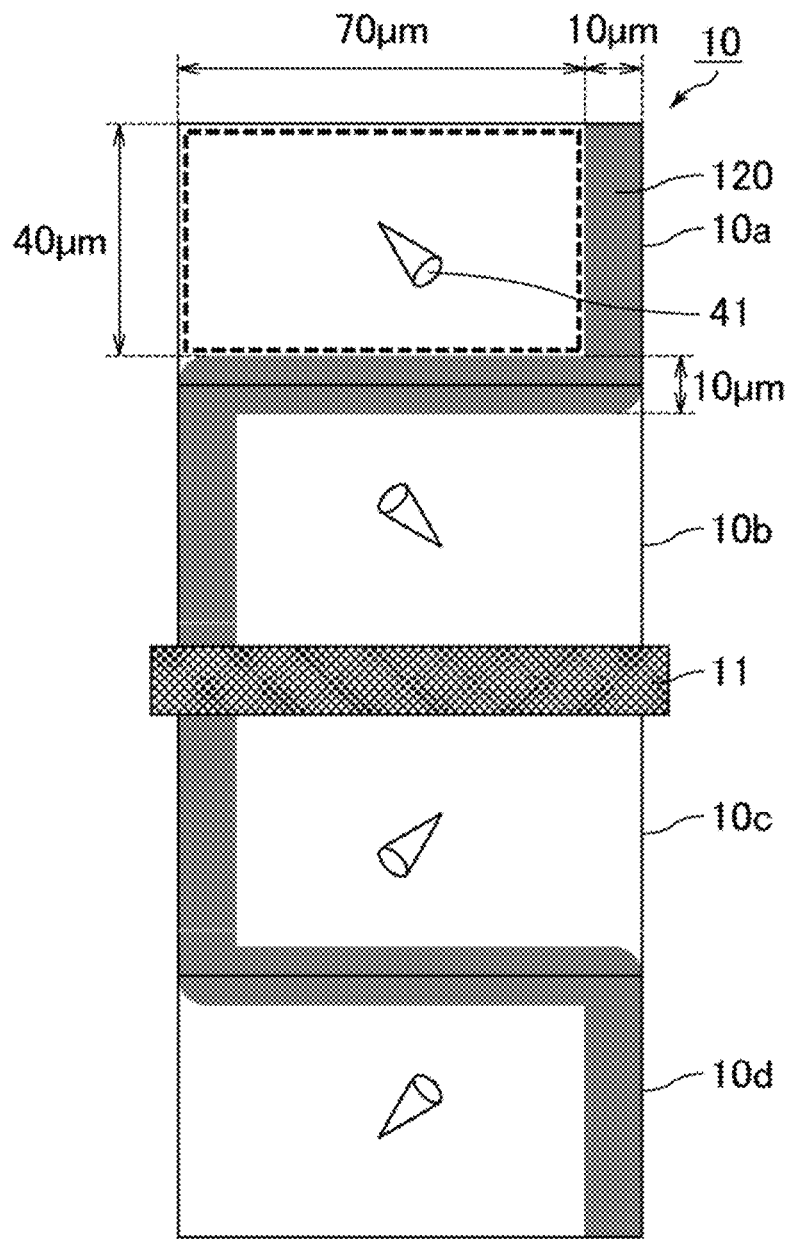
FIG. 14 is a schematic plan view of a pixel illustrating dark line generation region in the liquid crystal display panel of Example 1.
Figure 15:
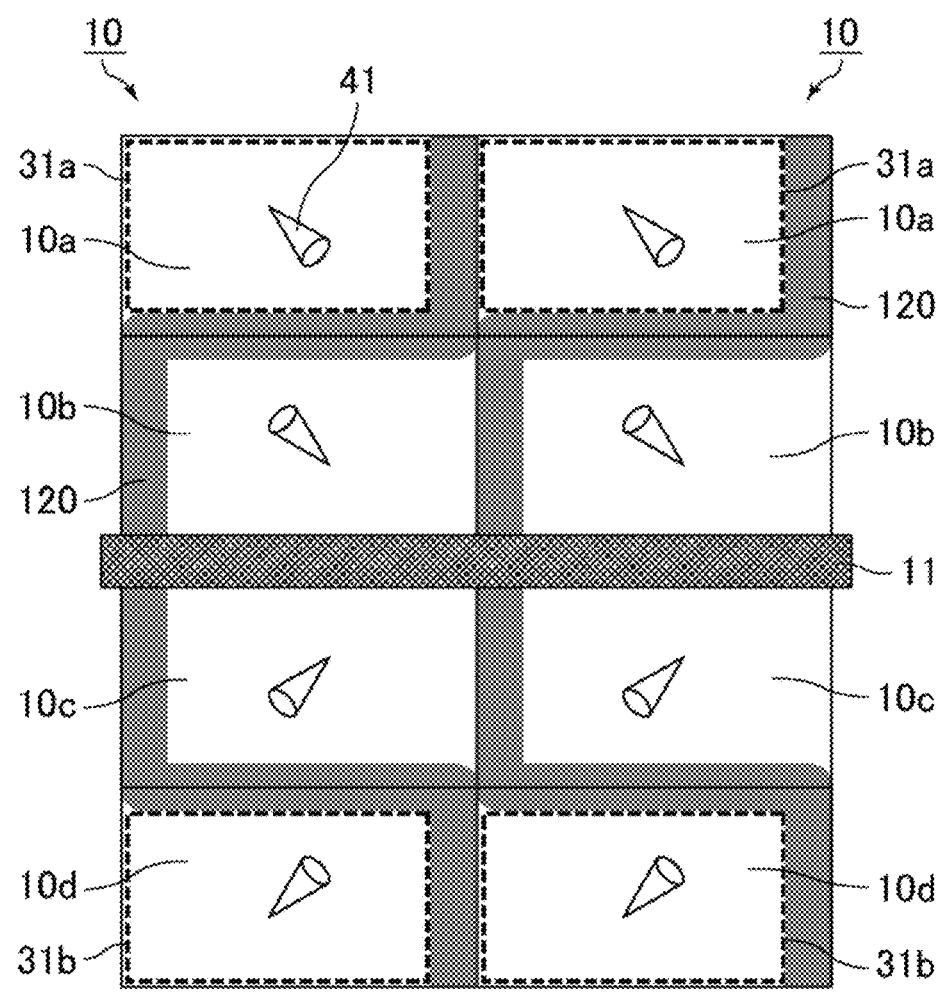
FIG. 15 is a schematic plan view of two pixels illustrating a dark line generation region in the liquid crystal display panel of Example 1.
Figure 18:
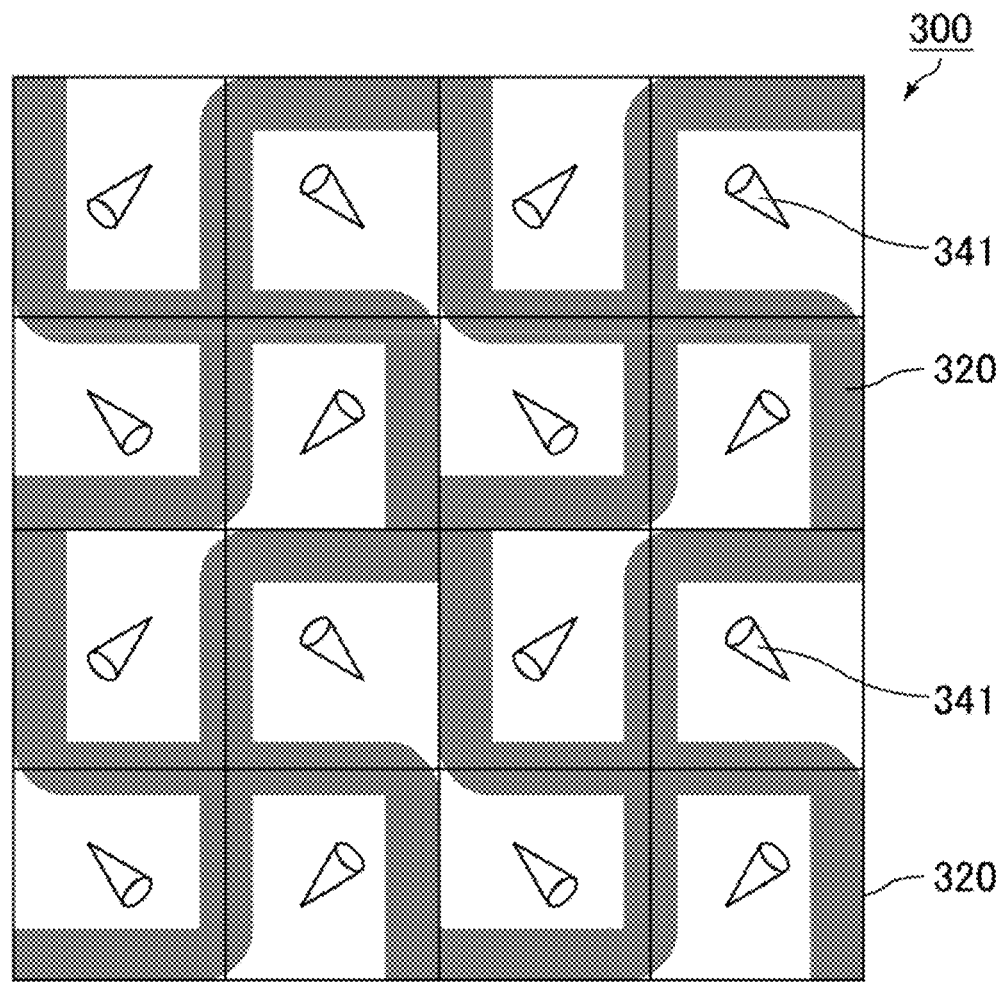
FIG. 18 is a schematic plan view of two pixels illustrating an example of the dark line generation region in the conventional 4D-RTN mode liquid crystal display panel.

FIGS. 14 and 15 are schematic views illustrating a region where the dark line is generated in the liquid crystal display panel of Example 1, FIG. 14 is a schematic plan view of one pixel, and FIG. 15 is a schematic plan view of two pixels. As illustrated in FIG. 14, the dark lines 120 has a width of about 10 μm, and the region where the dark line is not generated is surrounded by a dotted line. In Example 1, dark line generation was reduced, so that the proportion of the region with no dark line was high in one pixel and thus the transmittance in one pixel was high. FIG. 18 is a schematic plan view of two pixels illustrating an example of the region where the dark line is generated in the conventional 4D-RTN mode liquid crystal display panel. Comparing the regions where the dark line is generated in the two pixels, it is found that, in FIG. 15 illustrating the region where the dark line is generated in the liquid crystal display panel of Example 1, a proportion occupied by the region where the dark line is not generated is markedly higher than that of FIG. 18 illustrating the region where the dark line is generated in the conventional 4D-RTN mode liquid crystal display panel.

Example 2

In Example 1, the photo-alignment treatment was performed using the photo-alignment treatment device including one polarizer while the polarization axis of the polarizer is rotated. On the other hand, in Example 2, the photo-alignment treatment was performed using the photo-alignment treatment device including the multiple polarizers while the polarizer is switched. In Example 2, the liquid crystal display panel was prepared in the same manner as that in Example 1 except that the photo-alignment treatment device of Embodiment 2 in FIG. 3 was used in the photo-alignment treatment.

The photo-alignment treatment device used in Example 2 includes a first polarizer in which the polarization axis is set to +45° with respect to the light irradiation direction, a second polarizer in which the polarization axis is set to −45° with respect to the light irradiation direction, and the polarizer switching mechanism that switches between the polarizers. Each of the first polarizer and the second polarizer has the rotation adjustment mechanism.

In the photo-alignment treatment for the TFT substrate, first, the moving direction of the TFT substrate was set to the first direction, the light irradiation direction was set to the second direction, and the first-time light irradiation was performed through the first polarizer in which the polarization axis was the +45° azimuth clockwise with respect to the light irradiation direction. The first direction and the second direction were parallel to each other. Portions that should not be irradiated with light were shielded from light with a light-shielding component. After the polarization axis of the first polarizer was adjusted by the rotation adjustment mechanism such that the exposure direction on the surface of the TFT substrate became substantially 45° with respect to the light irradiation direction, the first-time light irradiation was performed. Subsequently, the light shielding member was moved, the first polarizer was switched to the second polarizer in which the polarization axis was different from the +45° azimuth by 90° using the polarizer switching mechanism, the polarization axis of the second polarizer was adjusted by the rotation adjustment mechanism, the moving direction of the TFT substrate was set to the first direction, the light irradiation direction was set to the second direction, and the second-time light irradiation was performed. The polarization axis of the second polarizer is the −45° azimuth counterclockwise with respect to the light irradiation direction. The light shielding member was moved, the second polarizer was switched to the first polarizer using the polarizer switching mechanism, the polarization axis of the first polarizer was adjusted by the rotation adjustment mechanism, the moving direction 251 of the TFT substrate was set to the second direction, the light irradiation direction was set to the first direction, and the third-time light irradiation was performed. Finally, the light shielding member was moved, the first polarizer was switched to the second polarizer using the polarizer switching mechanism, the polarization axis of the second polarizer was adjusted by the rotation adjustment mechanism, the moving direction of the TFT substrate was set to the second direction, the light irradiation direction was set to the first direction, and the fourth-time light irradiation was performed. As in Example 1, in the TFT substrate subjected to the light irradiation, the pre-tilt azimuth varies in each of the regions corresponding to the four alignment regions as illustrated in FIGS. 11 and 13(a).

In the photo-alignment treatment for the CF substrate, first, the moving direction of the CF substrate was set to the second direction, the light irradiation direction was set to the first direction, and the first-time light irradiation was performed through the first polarizer in which the polarization axis was the +45° azimuth clockwise with respect to the light irradiation direction. Portions that should not be irradiated with light were shielded from light with a light-shielding component. After the polarization axis of the first polarizer was adjusted by the rotation adjustment mechanism such that the exposure direction on the surface of the CF substrate became substantially 45° with respect to the light irradiation direction, the first-time light irradiation was performed. Subsequently, the light shielding member was moved, the first polarizer was switched to the second polarizer in which the polarization axis was different from the +45° azimuth by 90° using the polarizer switching mechanism, the polarization axis of the second polarizer was adjusted by the rotation adjustment mechanism, the moving direction of the CF substrate was set to the second direction, the light irradiation direction was set to the first direction, and the second-time light irradiation was performed. The polarization axis of the second polarizer is the −45° azimuth counterclockwise with respect to the light irradiation direction. The light shielding member was moved, the second polarizer was switched to the first polarizer using the polarizer switching mechanism, the polarization axis of the first polarizer was adjusted by the rotation adjustment mechanism, the moving direction of the CF substrate was set to the first direction, the light irradiation direction was set to the second direction, and the third-time light irradiation was performed. Finally, the light shielding member was moved, the first polarizer was switched to the second polarizer using the polarizer switching mechanism, the polarization axis of the second polarizer was adjusted by the rotation adjustment mechanism, the moving direction of the CF substrate was set to the first direction, the light irradiation direction was set to the second direction, and the fourth-time light irradiation was performed. As in Example 1, in the CF substrate subjected to the light irradiation, the pre-tilt azimuth varies in each of the regions corresponding to the four alignment regions as illustrated in FIGS. 12 and 13(b).

Then, in the same manner as that in Example 1, the TFT substrate and CF substrate subjected to the light irradiation were bonded together, the liquid crystal composition was sealed between the substrates, and pair of polarizing plates was bonded together, thereby completing the liquid crystal display panel of Example 2. In the liquid crystal display panel of Example 2, the pixel was constructed with the alignment division pattern in which, when the azimuth along the lateral direction of the pixel was defined as 0°, the fourth alignment region where the tilt azimuth of the liquid crystal molecule was set to substantially 315°, the second alignment region where the tilt azimuth of the liquid crystal molecule was set to substantially 135°, the third alignment region where the tilt azimuth of the liquid crystal molecule was set to substantially 225°, and the first alignment region where the tilt azimuth of the liquid crystal molecule was set to substantially 45°, were arranged in the order. A backlight including white LEDs was bonded to the back surface of the liquid crystal display panel, so that a liquid crystal display device was produced. In Example 2, as in Example 1, the exposure directions on the surfaces of the TFT substrate and the CF substrate can be adjusted to be substantially 45° with respect to the light irradiation direction, and the tilt azimuth of the liquid crystal molecule can be set to the target angle.

Example 3

In Example 1, the photo-alignment treatment was performed using the photo-alignment treatment device including one light irradiation mechanism. On the other hand, in Example 3, the photo-alignment treatment was performed using the photo-alignment treatment device including multiple light irradiation mechanisms. In Example 3, the liquid crystal display panel was prepared in the same manner as that in Example 1 except that the photo-alignment treatment device of Embodiment 3 in FIG. 5 was used in the photo-alignment treatment.

The photo-alignment treatment device used in Example 3 includes a first light irradiation mechanism and a second light irradiation mechanism. The first light irradiation mechanism includes a third polarizer in which the polarization axis is the +45° azimuth clockwise with respect to the light irradiation direction. The second light irradiation mechanism includes a fourth polarizer in which the polarization axis is the −45° azimuth counterclockwise with respect to the light irradiation direction.

In the photo-alignment treatment for the TFT substrate, using the first light irradiation mechanism, the moving direction of the TFT substrate was set to the first direction, the light irradiation direction was set to the second direction, and the polarization axis of the third polarizer was adjusted by the rotation adjustment mechanism such that the exposure direction on the surface of the TFT substrate became substantially 45° with respect to the light irradiation direction. Then, the first-time light irradiation was performed. The first direction and the second direction were parallel to each other. A portion that should not be irradiated with light is shielded from light with the first light-shielding component. Subsequently, using the second light irradiation mechanism, the portion where the light irradiation was not performed was shielded by the second light-shielding component, the moving direction of the TFT substrate was set to the first direction, the light irradiation direction was set to the second direction, and the polarization axis of the fourth polarizer was adjusted by the rotation adjustment mechanism such that the exposure direction on the surface of the TFT substrate became substantially 45° with respect to the light irradiation direction. Then, the second-time light irradiation was performed. Using the first light irradiation mechanism, a first light shielding member was moved, the moving direction of the TFT substrate was set to the second direction, the light irradiation direction was set to the first direction, and the polarization axis of the third polarizer was adjusted by the rotation adjustment mechanism such that the exposure direction on the surface of the TFT substrate became substantially 45° with respect to the light irradiation direction. Then, the third-time light irradiation was performed. Finally, using the second light irradiation mechanism, a second light shielding member was moved, the moving direction of the TFT substrate was set to the second direction, the light irradiation direction was set to the first direction, and the polarization axis of the fourth polarizer was adjusted by the rotation adjustment mechanism such that the exposure direction on the surface of the TFT substrate became substantially 45° with respect to the light irradiation direction. Then, the fourth-time light irradiation was performed. As in Example 1, in the TFT substrate subjected to the light irradiation, the pre-tilt azimuth varies in each of the regions corresponding to the four alignment regions as illustrated in FIGS. 11 and 13(a).

In the photo-alignment treatment for the CF substrate, using the first light irradiation mechanism, the moving direction of the CF substrate was set to the second direction, the light irradiation direction was set to the first direction, and the polarization axis of the third polarizer was adjusted by the rotation adjustment mechanism such that the exposure direction on the surface of the CF substrate became substantially 45° with respect to the light irradiation direction. Then, the first-time light irradiation was performed. A portion that should not be irradiated with light is shielded from light with the first light-shielding component. Subsequently, using the second light irradiation mechanism, the portion where the light irradiation was not performed was shielded by the second light-shielding component, the moving direction of the CF substrate was set to the second direction, the light irradiation direction was set to the first direction, and the polarization axis of the fourth polarizer was adjusted by the rotation adjustment mechanism such that the exposure direction on the surface of the CF substrate became substantially 45° with respect to the light irradiation direction. Then, the second-time light irradiation was performed. Using the first light irradiation mechanism, the first light shielding member was moved, the moving direction of the CF substrate was set to the first direction, the light irradiation direction was set to the second direction, and the polarization axis of the third polarizer was adjusted by the rotation adjustment mechanism such that the exposure direction on the surface of the CF substrate became substantially 45° with respect to the light irradiation direction. Then, the third-time light irradiation was performed. Finally, using the second light irradiation mechanism, the second light shielding member was moved, the moving direction of the CF substrate was set to the first direction, the light irradiation direction was set to the second direction, and the polarization axis of the fourth polarizer was adjusted by the rotation adjustment mechanism such that the exposure direction on the surface of the CF substrate became substantially 45° with respect to the light irradiation direction. Then, the fourth-time light irradiation was performed. As in Example 1, in the CF substrate subjected to the light irradiation, the pre-tilt azimuth varies in each of the regions corresponding to the four alignment regions as illustrated in FIGS. 12 and 13(b).

Then, in the same manner as that in Example 1, the TFT substrate and CF substrate subjected to the light irradiation were bonded together, the liquid crystal composition was sealed between the substrates, and pair of polarizing plates was bonded together, thereby completing the liquid crystal display panel of Example 3. In the liquid crystal display panel of Example 3, the pixel was constructed with the alignment division pattern in which, when the azimuth along the lateral direction of the pixel was defined as 0°, the fourth alignment region where the tilt azimuth of the liquid crystal molecule was set to substantially 315°, the second alignment region where the tilt azimuth of the liquid crystal molecule was set to substantially 135°, the third alignment region where the tilt azimuth of the liquid crystal molecule was set to substantially 225°, and the first alignment region where the tilt azimuth of the liquid crystal molecule was set to substantially 45°, were arranged in the order. A backlight including white LEDs was bonded to the back surface of the liquid crystal display panel, so that a liquid crystal display device was produced. In Example 3, as in Example 1, the exposure directions on the surfaces of the TFT substrate and the CF substrate can be adjusted to be substantially 45° with respect to the light irradiation direction, and the tilt azimuth of the liquid crystal molecule can be set to the target angle.

A method for manufacturing the conventional 4D-RTN mode liquid crystal display panel 300 will be described below as a reference example with reference to FIGS. 20 to 22, and a method for manufacturing the conventional 4D-RTN mode liquid crystal display panel 400 will be described below as a reference example with reference to FIGS. 23 to 25.

Reference Example 1

Figure 20:
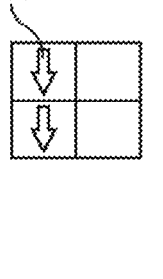
FIG. 20 is a view illustrating an example of photo-alignment treatment for a TFT substrate in the conventional 4D-RTN mode liquid crystal display panel.

As illustrated in FIG. 20, for the conventional 4D-RTN mode liquid crystal display panel 300, in the photo-alignment treatment for the TFT substrate, a right half of the half pixel is shielded from the light, and the first-time light irradiation is performed on a left half of the half pixel when the moving direction 351 of the TFT substrate or the light source is set to the vertical direction of the pixel and when the light irradiation direction 352 is set in parallel with the moving direction 351 of the TFT substrate or the light source. Then, the left half of the half pixel is shielded from light and second light irradiation is performed on the right half of the half pixel by setting the moving direction 351 of the TFT substrate or the light source and the light irradiation direction 352 to be opposite to the respective directions in the first light irradiation. In the alignment treatment for the CF substrate, as illustrated in FIG. 21, a lower half of the half pixel is shielded from the light, and the first-time light irradiation is performed on an upper half of the half pixel when the moving direction 351 of the CF substrate or the light source is set to the horizontal direction of the pixel and when the light irradiation direction 352 is set in parallel with the moving direction 351 of the TFT substrate or the light source. The upper half of the half pixel is then shielded from light and second light irradiation is performed on the lower half of the half pixel by setting the moving direction 351 of the TFT substrate or the light source and the light irradiation direction 352 to be opposite to the respective directions in the first light irradiation.

Figures 22, 23:
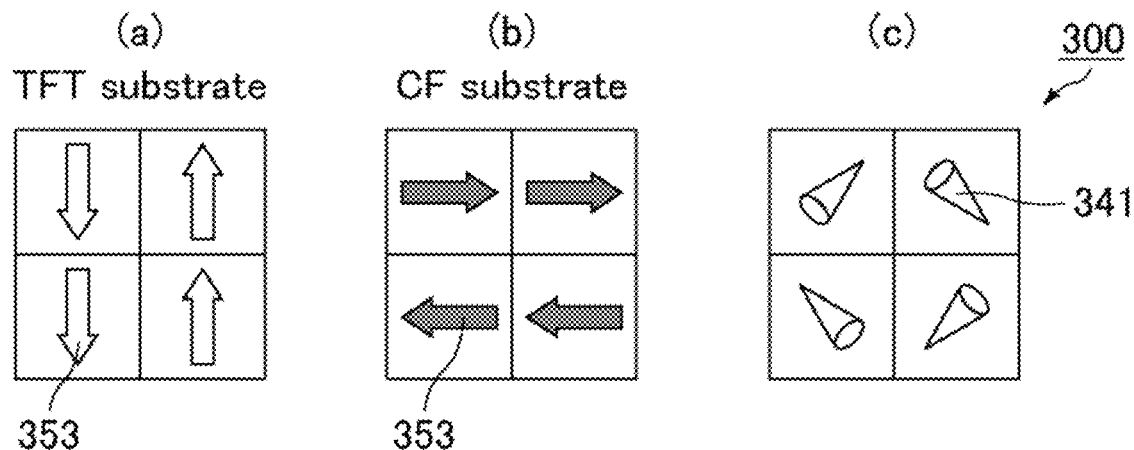
FIG. 22 is a schematic plan view illustrating an example of pre-tilt azimuths of the TFT substrate and the CF substrate and exemplary tilt azimuths of liquid crystal molecules in the conventional 4D-RTN mode liquid crystal display panel.
FIG. 23 is a view illustrating another example of the photo-alignment treatment for the TFT substrate in the conventional 4D-RTN mode liquid crystal display panel.

FIG. 22 illustrates a schematic plan view illustrating an example of the pre-tilt azimuths of the TFT substrate and the CF substrate and the tilt azimuth of the liquid crystal molecule in the conventional 4D-RTN mode liquid crystal display panel 300. FIG. 22(a) illustrates the pre-tilt azimuth of the TFT substrate, FIG. 22(b) illustrates the pre-tilt azimuth of the CF substrate, and FIG. 22(c) illustrates the tilt azimuths of liquid crystal molecules 341 in the respective alignment regions when voltage is applied. As illustrated in FIGS. 22(a) and 22(b), in a plan view of the liquid crystal display panel 300, the left and right halves of the half pixel of the TFT substrate are different from each other in a pre-tilt azimuth 353, and the upper and lower halves of the half pixel of the CF substrate are different from each other in the pre-tilt azimuth 353. When the TFT substrate and the CF substrate are bonded to each other, the pre-tilt azimuth 353 provided by the TFT substrate is perpendicular to the pre-tilt azimuth 353 provided by the CF substrate in each alignment region. As illustrated in FIG. 22(c), in the conventional 4D-RTN mode, the half pixel is divided into the four alignment regions, and the tilt azimuth of the liquid crystal molecule varies in each of the alignment regions.

Reference Example 2

Figure 21:
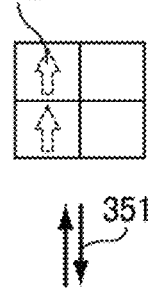
FIG. 21 is a view illustrating an example of photo-alignment treatment for a CF substrate in the conventional 4D-RTN mode liquid crystal display panel.

As illustrated in FIG. 21, for the conventional 4D-RTN mode liquid crystal display panel 400, in the alignment treatment for the TFT substrate, the lower half of the half pixel is shielded from the light, and the first-time light irradiation is performed on the upper half of the half pixel when the moving direction 451 of the TFT substrate or the light source is set to the horizontal direction of the pixel and when the light irradiation direction 452 is set to the vertical direction of the pixel. Then, the upper half of the half pixel is shielded from light and second light irradiation is performed on the lower half of the half pixel by setting the moving direction 451 of the TFT substrate or the light source and the light irradiation direction 452 to be opposite to the respective directions in the first light irradiation. In the alignment treatment for the CF substrate, as illustrated in FIG. 22, the right half of the half pixel is shielded from the light, and first-time light irradiation is performed on the left half of the half pixel when the moving direction 451 of the CF substrate or the light source is set to the vertical direction of the pixel and when the light irradiation direction 452 is set to the horizontal direction of the pixel. Then, the left half of the half pixel is shielded from light and second light irradiation is performed on the right half of the half pixel by setting the moving direction 451 of the CF substrate or the light source and the light irradiation direction 452 to be opposite to the respective directions in the first light irradiation.

Figures 24, 25:
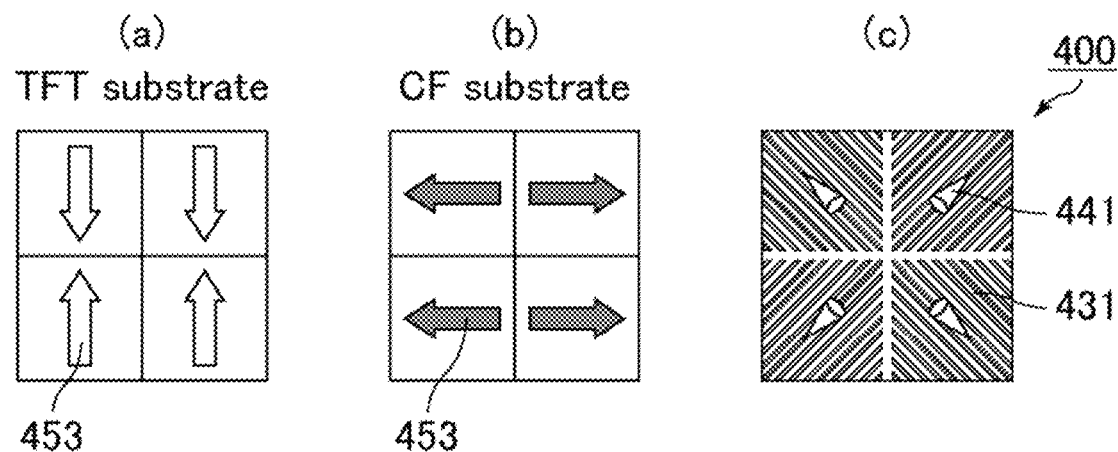
FIG. 24 is a view illustrating another example of the photo-alignment treatment for the CF substrate in the conventional 4D-RTN mode liquid crystal display panel.
FIG. 25 is a schematic plan view illustrating another example of the pre-tilt azimuths of the TFT substrate and the CF substrate and the tilt azimuths of the liquid crystal molecules in the conventional 4D-RTN mode liquid crystal display panel.

FIG. 25 illustrates a schematic plan view illustrating another example of the pre-tilt azimuths of the TFT substrate and the CF substrate and the tilt azimuth of the liquid crystal molecule in the conventional 4D-RTN mode liquid crystal display panel. FIG. 25(a) illustrates the pre-tilt azimuth of the TFT substrate, FIG. 25(b) illustrates the pre-tilt azimuth of the CF substrate, and FIG. 25(c) illustrates the tilt azimuths of liquid crystal molecules 441 in the respective alignment regions when voltage is applied. As illustrated in FIGS. 25(a) and 25(b), in a plan view of the liquid crystal display panel 400, the upper and lower halves of the half pixel of the TFT substrate are different from each other in a pre-tilt azimuth 453, and the right and left halves of the half pixel of the CF substrate are different from each other in the pre-tilt azimuth 453. When the TFT substrate and the CF substrate are bonded to each other, the pre-tilt azimuth 453 provided by the TFT substrate is perpendicular to the pre-tilt azimuth 453 provided by the CF substrate in each alignment region. As illustrated in FIG. 25(c), in the second conventional 4D-RTN mode, the half pixel is divided into four alignment regions, and the liquid crystal molecules are aligned in each alignment region by an electric field generated by a slit 431 formed in the pixel electrode when voltage is applied.

[Additional Remarks]

An aspect of the present invention may be photo-alignment treatment device for a liquid crystal display panel substrate, the photo-alignment treatment device including: at least one light irradiation mechanism including a light source, a polarizer, and a rotation adjustment mechanism and configured to irradiate a liquid crystal display panel substrate with light emitted from the light source through the polarizer; and a stage configured to support the liquid crystal display panel substrate thereon, the photo-alignment treatment device being configured to irradiate the liquid crystal display panel substrate with light while moving the liquid crystal display panel substrate or while moving the light source with respect to the liquid crystal display panel substrate, a light irradiation direction with respect to the liquid crystal display panel substrate being parallel to a moving direction of the liquid crystal display panel substrate or a moving direction of the light source, the rotation adjustment mechanism being configured to rotate a polarization axis of the polarizer to adjust an exposure direction on a surface of the liquid crystal display panel substrate to substantially 45° with respect to the light irradiation direction. The rotation adjustment mechanism can match the azimuth of the polarization axis of the polarizer with respect to the light irradiation direction with the exposure direction on the surface of the liquid crystal display panel substrate to set the tilt azimuth of the liquid crystal molecules in the liquid crystal display panel to a desired angle.

The rotation adjustment mechanism may be configured to rotate the polarization axis of the polarizer in a range of −15° to +15° from the 45° azimuth.

The photo-alignment treatment device may further include a rotation mechanism configured to rotate the polarization axis of the polarizer by an angle selected from substantially 45° and substantially 90° from the 45° azimuth.

The photo-alignment treatment device may further include a polarizer switching mechanism configured to switch multiple polarizers having polarization axes which are different from each other by substantially 45° or substantially 90°.

The polarizer may be a wire grid polarizer.

The photo-alignment treatment device may further include a wavelength selection filter provided between the light source and the polarizer, and the wavelength selection filter may be configured to transmit light having a dominant wavelength ranging from 280 nm to 400 nm.

The light applied to the liquid crystal display panel substrate may have an irradiation angle ranging from 30° to 60°.

The polarizer may have an extinction ratio ranging from 50:1 to 500:1.

The light emitted from the light source may have an intensity ranging from 10 mJ/cm$^2$ to 100 mJ/cm$^2$.

The photo-alignment treatment device may include two, three, or four light irradiation mechanisms.

Another aspect of the present invention may be a method for manufacturing a liquid crystal display panel including: forming a first vertical alignment film on a surface of a first substrate including a pixel electrode and forming a second vertical alignment film on a surface of a second substrate including a counter electrode; performing a photo-alignment treatment by irradiating the first substrate provided with the first vertical alignment film on the surface and the second substrate provided with the second vertical alignment film on the surface with light emitted from a light source through a polarizer; and forming a liquid crystal layer containing liquid crystal molecules between the first substrate and the second substrate, the photo-alignment treatment being performed using the photo-alignment treatment device for a liquid crystal display panel substrate. A liquid crystal display panel can be manufactured such that the tilt azimuth of the liquid crystal molecule becomes the target angle by performing the photo-alignment treatment using the photo-alignment treatment device for a liquid crystal display panel substrate.

The liquid crystal display panel may include, in the given order: the first substrate including the pixel electrode; the first vertical alignment film; the liquid crystal layer containing the liquid crystal molecules; the second vertical alignment film; and the second substrate including the counter electrode, the liquid crystal display panel may include a pixel in which four alignment regions having different tilt azimuths of the liquid crystal molecules are arranged along a longitudinal direction of the pixel, the four alignment regions may include a first alignment region having a tilt azimuth of substantially 45°, a second alignment region having a tilt azimuth of substantially 135°, a third alignment region having a tilt azimuth of substantially 225°, and a fourth alignment region having a tilt azimuth of substantially 315°, where the azimuth along a lateral direction of the pixel is defined as 0°, the liquid crystal molecules may be aligned substantially perpendicularly to the first vertical alignment film and the second vertical alignment film and tilted along the tilt azimuths when no voltage is applied to the liquid crystal layer, the liquid crystal molecules may be more greatly tilted along the tilt azimuths when voltage is applied to the liquid crystal layer, and the liquid crystal molecules may have a twist angle of substantially 0° in each of the four alignment regions in a plan view of the liquid crystal display panel.

The features of the present invention described above may appropriately be combined within the spirit of the present invention.

REFERENCE SIGNS LIST

10: pixel
10a, 10b, 10c, 10d: alignment region
11: gate signal line (signal line)
20: first polarizing plate
30: liquid crystal display panel substrate (first substrate)
31: pixel electrode
40: liquid crystal layer
41: liquid crystal molecule
50: second substrate
51: counter electrode
60: second polarizing plate
70: (first) vertical alignment film
80: (second) vertical alignment film
90: sealing material
100, 300, 400: liquid crystal display panel
120, 320, 420: dark line
220: light source
221: light
230A, 230B, 230C, 230D, 230E: polarizer
231A, 231B, 231C, 231D, 231E: polarization axis
235: wavelength selection filter
240: light-shielding component
250: stage
252, 352, 452: light irradiation direction
251, 351, 451: substrate moving direction
253A, 253B, 253C, 253E, 353, 453: exposure direction (pre-tilt azimuth)
260A, 260B, 260C, 260D, 260E: rotation adjustment mechanism
264: rotation mechanism
265: polarizer switching mechanism
270: lamp box
280A, 280B, 280E: light irradiation mechanism
1000, 2000, 3000: photo-alignment treatment device

The invention claimed is:

1. The method for manufacturing a liquid crystal display panel, comprising:
    forming a first vertical alignment film on a surface of a first substrate including a pixel electrode and forming a second vertical alignment film on a surface of a second substrate including a counter electrode;
    performing a photo-alignment treatment by irradiating the first substrate provided with the first vertical alignment film on the surface of the first substrate and the second substrate provided with the second vertical alignment film on the surface of the second substrate with light emitted from a light source through a polarizer; and
    forming a liquid crystal layer containing liquid crystal molecules between the first substrate and the second substrate,
    the photo-alignment treatment being performed using a photo-alignment treatment device for a liquid crystal display panel substrate, the photo-alignment treatment device comprising:
        at least one light irradiation mechanism including a light source, a polarizer, and a rotation adjustment mechanism and configured to irradiate the liquid crystal display panel substrate with light emitted from the light source through the polarizer; and a stage configured to support the liquid crystal display panel substrate thereon, the photo-alignment treatment device being configured to irradiate the liquid crystal display panel substrate with light while moving the liquid crystal display panel substrate or while moving the light source with respect to the liquid crystal display panel substrate, a light irradiation direction with respect to the liquid crystal display panel substrate being parallel to a moving direction of the liquid crystal display panel substrate or a moving direction of the light source, the rotation adjustment mechanism being configured to rotate a polarization axis of the polarizer to adjust an exposure direction on a surface of the liquid crystal display panel substrate to substantially 45° with respect to the light irradiation direction;

wherein the liquid crystal display panel includes, in the given order:

the first substrate including the pixel electrode;

the first vertical alignment film;

the liquid crystal layer containing the liquid crystal molecules;

the second vertical alignment film; and the second substrate including the counter electrode, the liquid crystal display panel includes a pixel in which four alignment regions having different tilt azimuths of the liquid crystal molecules are arranged along a longitudinal direction of the pixel, the four alignment regions include a first alignment region having a tilt azimuth of substantially 45°, a second alignment region having a tilt azimuth of substantially 135°, a third alignment region having a tilt azimuth of substantially 225°, and a fourth alignment region having a tilt azimuth of substantially 315°, where the azimuth along a lateral direction of the pixel is defined as 0°, the liquid crystal molecules are aligned substantially perpendicularly to the first vertical alignment film and the second vertical alignment film and tilted along the tilt azimuths when no voltage is applied to the liquid crystal layer, the liquid crystal molecules are more greatly tilted along the tilt azimuths when voltage is applied to the liquid crystal layer, and the liquid crystal molecules have a twist angle of substantially 0° in each of the four alignment regions in a plan view of the liquid crystal display panel.

2. The photo-alignment treatment device for a liquid crystal display panel substrate according to claim 1, wherein the rotation adjustment mechanism is configured to rotate the polarization axis of the polarizer in a range of −15° to +15° from a 45° azimuth.

3. The photo-alignment treatment device for a liquid crystal display panel substrate according to claim 1, further comprising a rotation mechanism configured to rotate the polarization axis of the polarizer by an angle selected from substantially 45° and substantially 90° from the 45° azimuth.

4. The photo-alignment treatment device for a liquid crystal display panel substrate according to claim 1, further comprising a polarizer switching mechanism configured to switch multiple polarizers having polarization axes which are different from each other by substantially 45° or substantially 90°.

5. The photo-alignment treatment device for a liquid crystal display panel substrate according to claim 1, wherein the polarizer is a wire grid polarizer.

6. The photo-alignment treatment device for a liquid crystal display panel substrate according to claim 1, further comprising a wavelength selection filter provided between the light source and the polarizer, the wavelength selection filter being configured to transmit light having a dominant wavelength ranging from 280 to 400 nm.

7. The photo-alignment treatment device for a liquid crystal display panel substrate according to claim 1, wherein the light applied to the liquid crystal display panel substrate has an irradiation angle ranging from 30° to 60°.

8. The photo-alignment treatment device for a liquid crystal display panel substrate according to claim 1, wherein the polarizer has an extinction ratio ranging from 50:1 to 500:1.

9. The photo-alignment treatment device for a liquid crystal display panel substrate according to claim 1, wherein the light emitted from the light source has an intensity ranging from 10 mJ/cm$^2$ to 100 mJ/cm$^2$.

10. The photo-alignment treatment device for a liquid crystal display panel substrate according to claim 1, comprising two, three, or four light irradiation mechanisms.

* * * * *